(12) United States Patent
Alla

(10) Patent No.: US 12,609,997 B2
(45) Date of Patent: *Apr. 21, 2026

(54) DYNAMIC AND STATIC DATA OF METADATA OBJECTS

(71) Applicant: Comcast Cable Communications, LLC, Philadelphia, PA (US)

(72) Inventor: Sridhar Alla, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,927

(22) Filed: Jun. 16, 2022

(65) Prior Publication Data

US 2022/0337676 A1     Oct. 20, 2022

Related U.S. Application Data

(63) Continuation of application No. 17/188,748, filed on Mar. 1, 2021, now Pat. No. 11,394,796, which is a continuation of application No. 16/381,819, filed on Apr. 11, 2019, now Pat. No. 10,938,940, which is a continuation of application No. 14/740,879, filed on Jun. 16, 2015, now Pat. No. 10,313,468.

(51) Int. Cl.
| *G06F 15/167* | (2006.01) |
| *H04L 67/561* | (2022.01) |
| *H04L 67/568* | (2022.01) |
| *H04L 67/5682* | (2022.01) |

(52) U.S. Cl.
CPC .......... *H04L 67/568* (2022.05); *H04L 67/561* (2022.05); *H04L 67/5682* (2022.05)

(58) Field of Classification Search
CPC .. H04L 67/568; H04L 67/5682; H04L 67/561
USPC ................................................... 709/203, 213
See application file for complete search history.

(56) References Cited

U.S. PATENT DOCUMENTS

| 6,591,266 B1 | 7/2003 | Li et al. | |
| 7,096,418 B1 | 8/2006 | Singhal et al. | |
| 7,962,594 B2 | 6/2011 | Kasriel et al. | |
| 8,745,066 B2 | 6/2014 | Zenger et al. | |
| 9,002,890 B2 * | 4/2015 | Price ....................... | G06F 16/13 |
| | | | 707/783 |

(Continued)

FOREIGN PATENT DOCUMENTS

WO        2013022527 A1     2/2013

*Primary Examiner* — Duyen M Doan
(74) *Attorney, Agent, or Firm* — Banner & Witcoff, Ltd.

(57)        ABSTRACT

Aspects described herein relate to processing metadata requests using a cache. For example, a metadata object may be processed into two or more portions. The two or more portions or data generated based on the two or more portions may be stored into a cache. After receiving a request for the metadata object from a computing device, the metadata object may be generated based on the data stored in the cache and the generated metadata object may be transmitted as a response to the request for the metadata object. Further aspects relate to personalizing the metadata object at the cache prior to transmitting the response to the request for the metadata object. Further aspects relate to updating a portion of the metadata object, such as a portion that includes dynamic data, prior to transmitting the response to the request.

28 Claims, 10 Drawing Sheets

(56) References Cited

U.S. PATENT DOCUMENTS

| | | | |
|---|---|---|---|
| 2002/0017082 A1 | 2/2002 | Cornell et al. | |
| 2003/0001888 A1 | 1/2003 | Power | |
| 2003/0004998 A1 | 1/2003 | Datta | |
| 2003/0055915 A1* | 3/2003 | Ngo | H04L 67/561 |
| | | | 709/219 |
| 2003/0151621 A1* | 8/2003 | McEvilly | H04N 21/441 |
| | | | 348/E7.071 |
| 2004/0128346 A1 | 7/2004 | Melamed et al. | |
| 2007/0255811 A1 | 11/2007 | Pettit et al. | |
| 2008/0281944 A1 | 11/2008 | Vorne et al. | |
| 2009/0012959 A1* | 1/2009 | Ylivainio | G06F 16/68 |
| 2009/0150518 A1 | 6/2009 | Lewin et al. | |
| 2010/0153415 A1* | 6/2010 | Muntz | G06F 16/1858 |
| | | | 707/758 |
| 2011/0066676 A1 | 3/2011 | Kleyzit et al. | |
| 2011/0313971 A1* | 12/2011 | Hironaga | G06F 3/0617 |
| | | | 707/610 |
| 2012/0159550 A1* | 6/2012 | Bajpai | H04N 21/482 |
| | | | 725/44 |
| 2012/0226962 A1* | 9/2012 | Franceschini | G06F 11/1012 |
| | | | 714/766 |
| 2012/0303697 A1 | 11/2012 | Alstad | |
| 2013/0179489 A1 | 7/2013 | Daley et al. | |
| 2013/0232216 A1 | 9/2013 | Tiger et al. | |
| 2014/0082672 A1* | 3/2014 | Casey | H04N 21/25891 |
| | | | 725/50 |
| 2014/0096014 A1 | 4/2014 | Johnson et al. | |
| 2014/0126718 A1 | 5/2014 | Movshovitz | |
| 2014/0130096 A1 | 5/2014 | Krishnamurthy | |
| 2014/0380364 A1 | 12/2014 | Jensen | |
| 2015/0026189 A1 | 1/2015 | Li et al. | |
| 2015/0127781 A1* | 5/2015 | Calvin | H04L 67/10 |
| | | | 709/219 |
| 2015/0161048 A1* | 6/2015 | Patil | G06F 16/172 |
| | | | 711/141 |
| 2017/0316024 A1* | 11/2017 | Panigrahy | G06F 3/064 |

* cited by examiner

Request and Response Traffic for User Device 202

Request and Response Traffic for User Device 203

Communication Between Devices

200

As a user browses the menu with available movies organized by rows, the user device may request an object for the next row of the menu After the object is received, the next row may be displayed based on the object

900

Cache Miss 5 Min Avg Response Times (ms)

DYNAMIC AND STATIC DATA OF METADATA OBJECTS

CROSS-REFERENCE TO RELATED APPLICATIONS

This application is continuation of U.S. application Ser. No. 17/188,748, filed Mar. 1, 2021, which is a continuation of U.S. application Ser. No. 16/381,819, filed Apr. 11, 2019, now U.S. Pat. No. 10,938,940, which is a continuation of U.S. application Ser. No. 14/740,879, filed Jun. 16, 2015, and now U.S. Pat. No. 10,313,468, which are hereby incorporated by reference in their entirety for all purposes.

BACKGROUND

Digital content is increasingly pervading every aspect of modern life. Many different types of devices allow users to consume digital content or information virtually anytime, anywhere. Often, these devices receive the digital content and other forms of data via one or more networks (e.g., the Internet, a wide-area network, or an information distribution network). As more and more devices are connected to the network and requesting data from the network, there is an ever present need to more efficiently and/or quickly respond to a device's request for data.

SUMMARY

This disclosure describes one or more embodiments for improving a network's response to a device's request for content. Embodiments are provided that use a cache to store metadata objects to accelerate the time it takes for the network to respond to a device's request for a metadata object. Various features described herein relate to processes that may be performed when a requested metadata object is or is not stored in the cache.

For example, a metadata object, such as a JavaScript Object Notation (JSON) object, may be processed into two or more portions, such as one or more portions of static data and one or more portions of dynamic data. The two or more portions may be stored into a cache. Alternatively, data generated based on the two or more portions, such as objects generated for populating various types of menus, may be stored in a cache. Examples of the types of objects that may be generated include a menu object, program object, episode object and showing object, and each type of object may be stored in a cache dedicated to that type of object. After receiving a request for the metadata object from a computing device, the metadata object may be generated based on the data stored in the cache and the generated metadata object may be transmitted as a response to the request for the metadata object.

Further aspects relate to personalizing the metadata object at the cache prior to transmitting the response to the request for the metadata object. For example, the cache may request personalization metadata from a personalization database and personalize the metadata object based on the received personalization metadata.

Further aspects relate to updating a portion of the metadata object, such as a portion that includes dynamic data, prior to transmitting the response to the request. For example, the cache may periodically transmit an index status check to determine whether an index of o central database has changed and, if so, the cache may request and receive an update the metadata object. The metadata stored by the cache may be updated based on the received update. The cache may also perform a similar check and update after determining that a request metadata object is stored in the cache.

This summary is not intended to identify critical or essential features of the disclosure, but merely to summarize certain features and variations thereof. Other details and features will be described in the sections that follow.

BRIEF DESCRIPTION OF THE DRAWINGS

These and other features, aspects, and advantages of the present disclosure will become better understood with regard to the following description, claims, and drawings. The present disclosure is illustrated by way of example and not limited by the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure.

Figure 1:
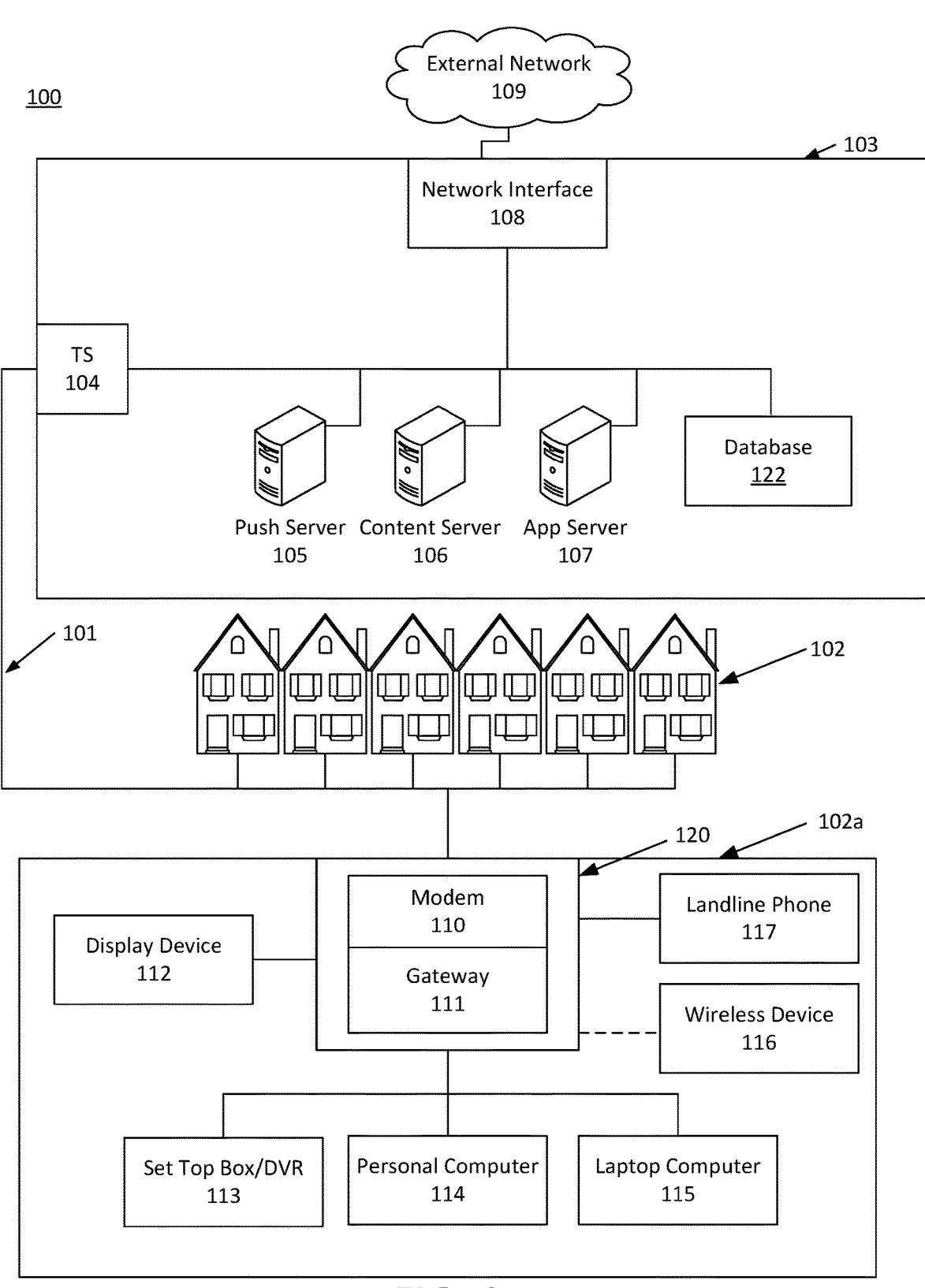
FIG. 1 illustrates an example system and network in which various features described herein may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102*a*). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term "premises" is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers and/or databases that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107. The local office may include one or more databases, such as database 122, that may store data for distribution to the devices of the premises 102 (e.g., content for populating menus).

The premises 102, such as the example home 102*a*, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102*a* to communicate with the local office 103, the one or more external networks 109, or other devices communicatively coupled thereto. The gateway 111 may include local network interfaces to provide communication signals to client devices in or near the example home 102*a*, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
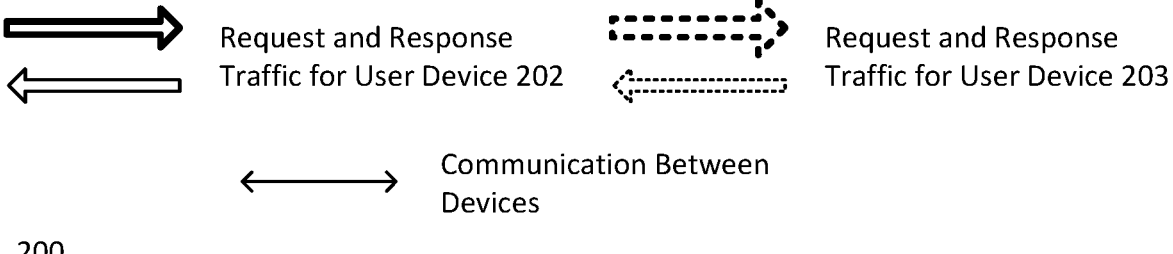
FIG. 2 illustrates another example system and network in which various features described herein may be implemented.
Figure 2:
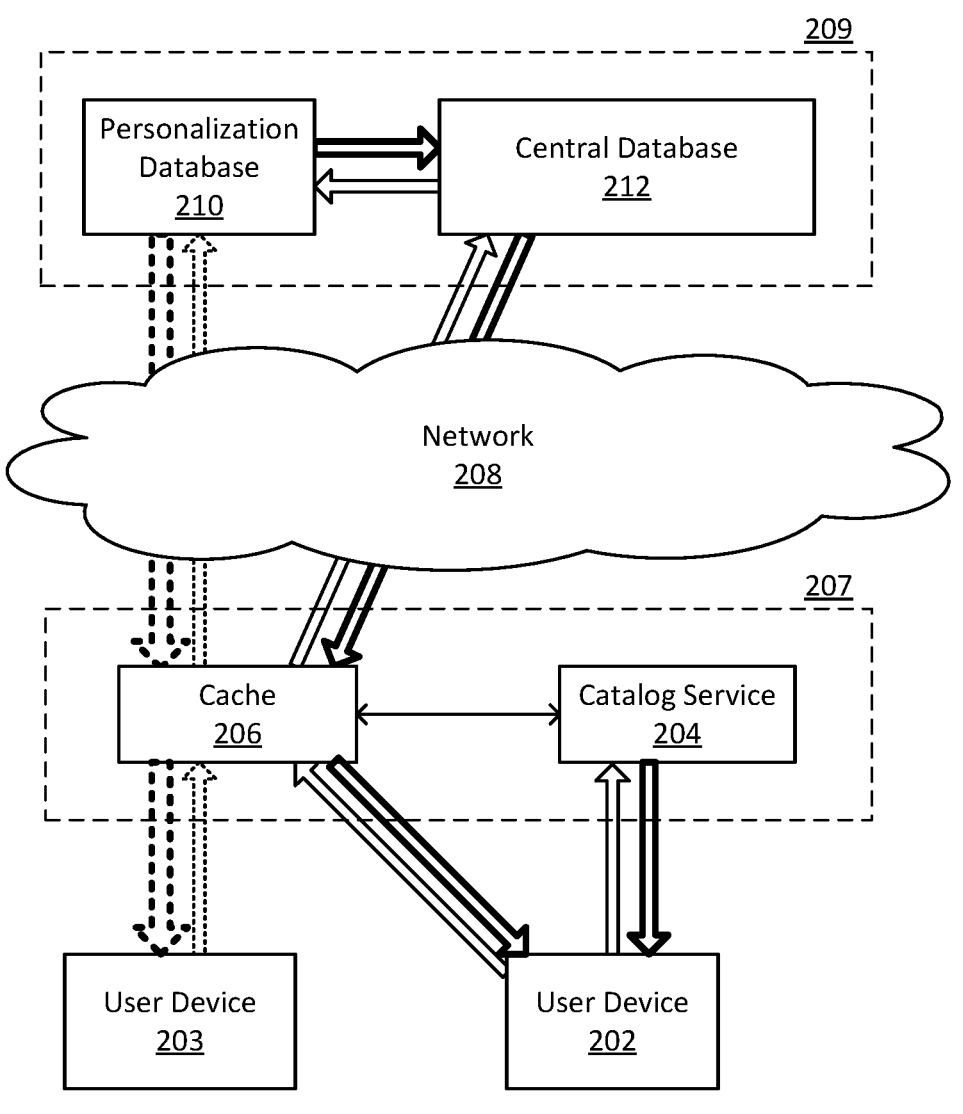

FIG. 2 illustrates another example communication network on which many of the various features described herein may be implemented. The communication network 200 of FIG. 2 may be part of, overlap with, be coupled to, include, and/or be separate from the communication network 100 of FIG. 1. For example, FIG. 2 shows user devices 202 and 203 in communication with a catalog service 204 and a cache 206, which may be via communication lines 101 or the TS 104, as described above with regard to FIG. 1. The user devices 202 and 203 may be similar to the types of devices described above in connection with devices 112-117 of FIG. 1. While the cache 206 and/or the catalog service 204 are not explicitly shown in the example of FIG. 1, one or more of these elements may be part of and/or coupled to the local office 103 or disposed elsewhere, such as a local head end or a network endpoint that includes the cache 206 and/or the catalog service 204. For example, the catalog service 204 or the cache 206 may be located at or included within an endpoint 207 of the distribution network 208 that is optically connected to the user devices 202 and 203. One such endpoint may be a Cross-Platform Runtime Environment (XRE) server.

The catalog service 204, the cache 206 and/or the TS 104 (and/or multiple other TSs) may be in communication with a data processing facility 209 via a network 208, such as a distribution network. The network 208 may include, for example, a backbone infrastructure and/or a converged regional area network (CRAN) for distributing communications and/or other signaling amongst various portions of the communications network. The data processing facility 209, such as a data center, may include various other devices that store and are configured to provide content and other data throughout the network. FIG. 2 illustrates two such devices: a personalization database 210 and a central database 212. The data processing facility 209 may be coupled to the external network 109, such as the Internet.

The data processing facility 209 may be responsible for providing data for various services, such as Title VI video services (e.g., services provided by the data processing facility and/or by other systems under control of a service provider) or other content services. For example, where a user of one of the user devices 202 and 203 wishes to consume a service (e.g., view a movie, a television program, or other content managed, sourced, and/or generated by the service provider), the data processing facility 209 may transmit or otherwise provide various types of data, such as metadata and content data, in connection with supplying the content service to the user device.

In connection with being able to request a particular service, the user device may need to be directed to an entity that will serve the data for the service to the user device. Accordingly, the user device may transmit a request to identify the entity that will serve the data for the service to the user device. Once the entity is identified, the user device may send a request for the service to the entity. In response to the request for the service, the entity may initiate a process that causes one or more other communications to be transmitted throughout the network and may involve one or more other devices located at various places throughout the communications network. Such a process may cause a delay before the entity can prepare and serve data for the service to the user device. Further, the communications network may include a large number of devices that can request a service and, in some instances, the number of requests that the devices transmit may number in the thousands per second. Such a high volume of requests increases the load on the network and may increase the delay between a particular request and the data being served to the requesting device.

FIG. 2 illustrates one example in which the delay described above may be reduced. In particular the cache 206 of FIG. 2 may be included in the communications network and may cache particular data objects, such as metadata objects, so that the cache 206 is able to transmit cached objects to various user devices instead of requesting the objects from the central database 212, which may improve the network's response time. Further, FIG. 2 illustrates an example in which the user device 202 first requests a metadata object, which causes the cache 206 to cache the metadata object, and the user device 203 later requests the same metadata object, which causes the cache 206 to respond using at least a portion of the metadata object stored by the cache 206. A metadata object can take various forms such as a JavaScript Object Notation (JSON) object or an Extensible Markup Language (XML) document object model (DOM) object. A more detailed discussion of the example depicted in FIG. 2 will now be described.

To begin the discussion of the example depicted in FIG. 2, a user of the user device 202 may wish to interact with a user interface, such as an electronic program guide, on demand menu, search results page, a content recommendation page, or other menu, to browse a catalog of content items provided by the user interface. For example, an on demand movie menu may be associated with a catalog for movies. Additionally, a catalog may be designated to a particular server in the communications network such that, for example, a catalog for movies and a catalog for television programs are designated to different servers. To be able to determine which server is designated to the catalog associated with the user interface the user wishes to view, the user device 202 may transmit a request for a listing of catalogs to the catalog service 204. Although not shown, the user device 203 may transmit a similar request for a listing of catalogs.

A listing of catalogs may be considered as being comprised of static data or data with a long lifetime. For example, the listing of catalogs may change once every couple of days. The user devices may be configured to periodically transmit a request for an updated listing of catalogs.

After receiving a request for a listing of catalogs, the catalog service 204 may respond to the user device 202 by transmitting a listing of catalogs that, for example, identifies each catalog and identifies a hostname or virtual IP address of the entity that will serve the data for that catalog, such as one or more Uniform Resource Locators (URLs) for requesting the data for that catalog (e.g., each URL may be for a particular metadata object). In this example, the address for the cache 206 may be embedded in each URL as the hostname or virtual IP address so that the client device 202 transmits a request for data to the cache 206. The URL may further include a particular port for use when transmitting a request for data to the cache 206.

In some arrangements (not shown in FIG. 2), the communications network may include plural caches similar to cache 206. Each cache may be designated to serve a particular set of devices (e.g., the cache 206 may be considered as being designated to serve devices 202 and 203, among others). The cache designations, in some instances, may be performed by a load balancer that is in communication with each cache. For example, the catalog service 204 may include a load balancer that is configured to send a ping periodically to each cache (e.g., transmit a/ping from the catalog service 204 to the cache 206) to determine a record of which caches are active and attempt to balance the load caused by the user devices among the active caches. Additionally or alternatively, the load balancer may assign a range of user device IP addresses to a specific cache.

Further, in some embodiments with plural caches, the caches may be in communication with each other to, for example, share and/or distribute portions of the stored data among the caches, such as by sharing the stored metadata objects or portions of the metadata objects. For example, if a cache miss occurs at a particular cache, that cache may perform a cache fill of the missing metadata object(s) and that cache may perform a process to cause the other caches to perform the same cache fill of the missing metadata object(s). In some instances, the cache may perform the processing using a Paxos algorithm.

After the user device 202 receives the listing of catalogs, the user device 202 may be able to proceed with populating or otherwise displaying the user interface. To initially populate the user interface with a portion of the listing of content items and to re-populate the user interface as the user browses the listing of content items, the user device 202 may determine which object(s) are needed to populate the user interface and transmit one or more requests for metadata objects to the cache 206, with each of the one or more requests including at least one of the URLs identified for the catalog associated with the user interface. In some arrangements, the request may be from a Hypertext Transfer Protocol (HTTP) Representational State Transfer (REST) application programming interface (API).

After a request for a metadata object is received at the cache 206 from the user device 202, the cache 206 may determine which metadata object is being requested (e.g., based on the URL included in the request), and may determine whether the metadata object is stored in the cache 206. In the example depicted in FIG. 2, the metadata object requested by user device 202 is not in the cache 206, so the cache 206 determines that the metadata object is not in the cache 206 and attempts to perform a cache fill by at least requesting the metadata object from the central database 212.

In some embodiments, the cache 206 may be implemented using a non-blocking I/O framework, such as a Netty framework, or implement a thread pool for handling requests as they are received. Further in some instances, the cache 206 may be implemented using a JAVA-based development kit (also referred to as a JDK), such as APACHE TOMCAT. For example, when a request is received, the cache 206 may create a thread for processing the request and/or generating a response (e.g., performing a cache fill or performing a cache hit). After the response is transmitted, the thread may be reused for another response.

Based on the implementation of the cache 206, the cache 206 may be configured to respond to a number of commands in addition to the above mentioned request and ping. For example, the cache 206 may be configured to respond to a metrics command (e.g., /metrics) by transmitting a message including one or more statistics describing the operation of the cache 206, such as the amount of data stored by the cache 206, the number of requests processed within a time window, an average amount of time spent between receipt of a request from a user device and transmission of a response to the user device when there is a cache hit, or an average amount of time spent between receipt of a request from a user device and transmission of a response to the user device when there is a cache miss. The cache 206 may be configured to respond to a health check command (e.g., /healthcheck) by transmitting a message including one or more statistics describing the operation of the cache 206 and that are usable for debugging purposes.

As depicted in FIG. 2, the central database 212 may receive a request for a metadata object from the cache 206. The central database 212 may have an index of various types of content stored as metadata and may allow for the metadata to be searched or retrieved. Accordingly, the central database 212 may, in response to receiving the request from the cache 206, search for the requested metadata object, generate the response with the requested metadata object and transmit the response to the cache 206. As compared to the above-mentioned catalogs, the index of the central database 212 may change more frequently. For example, the index may change each time a new item of content or program becomes available and, in some instances, new content items may become available every hour or couple of hours.

In some arrangements, the user device 202 may be configured to generate personalized user interfaces (e.g., a user of the user device 202 may have opted-in to an option for personalized menus). Accordingly, the central database 212 may determine whether to personalize the requested metadata object. This determination may be based on an identification of the user device 202 or the user associated with the user device 202, which may be included in the request sent from the cache 206, or a user profile that includes the settings for the user or the user device 202. If the metadata object is to be personalized, the central database 212, as depicted in FIG. 2, may request or retrieve personalization metadata from the personalization database 210 and the personalization database 210 may transmit the personalization metadata to the central database 212 for personalizing the metadata object for user device 202.

The personalization database 210 may store user history data, entitlement data, or other types of data usable as a basis for performing the personalization. For example, the personalization database 210 may include a purchase or viewing history for the user or the user device 202 (e.g., a listing of movies that were ordered in the last 3 months) or a listing of the entitlements for the user or the user device (e.g., a listing of the content the user or the user device 202 is allowed to consume). In some arrangements, the personalization database 210 may organize the personalization metadata to include data that describes a persona. A persona may, in some instances, be specific to the user or the user device 202. In other instances, the persona may be specific to a group of users or user devices (e.g., a persona for all users or devices that share the same entitlements). In some embodiments, the personalization database may be implemented using COUCHBASE technology or some other database technology.

Using the personalization metadata, the central database 212 may rank or order the items included in the metadata object based on the personalization metadata (e.g., rank the movies listed in a metadata object for a menu based on a purchase or viewing history, rank the items according to the persona described by the personalization metadata). In instances where a persona is specific to a group of users or user devices, the personalization may result in a metadata object that is similar or the same for all members of the group of users or user devices.

After the central database 212 has retrieved and/or personalized the metadata object, the central database 212 may transmit the metadata object to the cache 206, as depicted in FIG. 2. Upon receipt, the cache 206 may process the metadata object for storage into the cache and, as depicted in FIG. 2, may transmit the metadata object to the user device 202 as a response to the original request of the user device 202. After the user device 202 receives the metadata object, the metadata object may be processed and the user interface may be populated based on the metadata object.

Because the metadata object is now stored in the cache 206, subsequent request for the metadata object can be handled more quickly than the above example for the request from the user device 202. FIG. 2 illustrates this distinction by using solid arrows to designate traffic related to the request for the metadata object from the user device 202 and broken arrows to designate traffic related to the request for the metadata object from the user device 203.

Referring again to FIG. 2, the user device 203 may have already received the listing of catalogs from the catalog service 204 and the user device 203 may be ready to populate the user interface. Accordingly, one or more requests for metadata objects may be transmitted to the cache 206, with one of the requests being for the metadata object that is stored by the cache 206.

Upon receipt of a request for the metadata object from the user device 203, the cache 206 may determine which metadata object is being requested (e.g., based on the URL included in the request), and may determine whether the metadata object is stored in the cache 206. In the example depicted in FIG. 2, the metadata object requested by user device 203 is in the cache 206, so the cache 206 determines that the metadata object is in the cache 206 and attempts to perform a cache hit by at least retrieving a portion of the metadata object stored by the cache 206 and using the portion in a response to the user device 203.

In some instances, at a time when the cache 206 is processing the request from the user device 203, one or more portions of the metadata object stored by the cache 206 may be likely to be outdated. Accordingly, the cache 206 may be configured with a mechanism for updating the metadata object. For example, in connection with the changing index of the central database 212, the cache 206 may be configured to periodically (or upon receipt of each request from a user device) transmit an index status check to the central database 212 in order to determine whether the index has changed. If so, the cache 206 may request an update to one or more metadata objects stored in the cache, or request an update to a portion of each metadata object stored in the cache. Alternatively, the cache 206 may, upon retrieving the metadata object, determine which portions may be outdated and may request an update to those portions from the central database 212.

Additionally, the user device 203 may be configured to generate personalized user interfaces (e.g., a user of the user device 202 may have opted-in to an option for personalized menus). Accordingly, the cache 206 may determine whether to personalize the metadata object and, if the cache 206 determines to personalize the metadata object, the cache 206 may communicate with the personalization database 210 to retrieve the personalization metadata for the user device 203 or the user of the user device 203. Upon receiving the personalization metadata from the personalization database 210, the cache 206 may rank or order the items listed in the metadata object based on the personalization metadata. In some instances, the items of the metadata object for the user device 203 may be ranked or ordered differently than the items of the metadata object for the user device 202, such as when the persona for the user device 203 is different from the persona for the user device 202. In other instances, the items of the metadata object for the user device 203 may be ranked or ordered the same as the items of the metadata object for the user device 202, such as when the persona described by the personalization metadata is the same for both the user device 203 and the user device 202.

After the metadata object has been retrieved and/or processed by the cache 206, the cache 206 may transmit the metadata object to the user device 203 as a response to the request of the user device 203. After the user device 203 receives the metadata object, the metadata object may be processed and the user interface may be populated based on the metadata object. As illustrated in FIG. 2 by the fewer number of arrows for the request and response traffic for the user device 203 as compared to those for the user device 202, responding to the user device 203 may be performed more quickly by the cache 206 as compared to the time needed for the cache 206 to respond to the user device 202.

Figure 4:
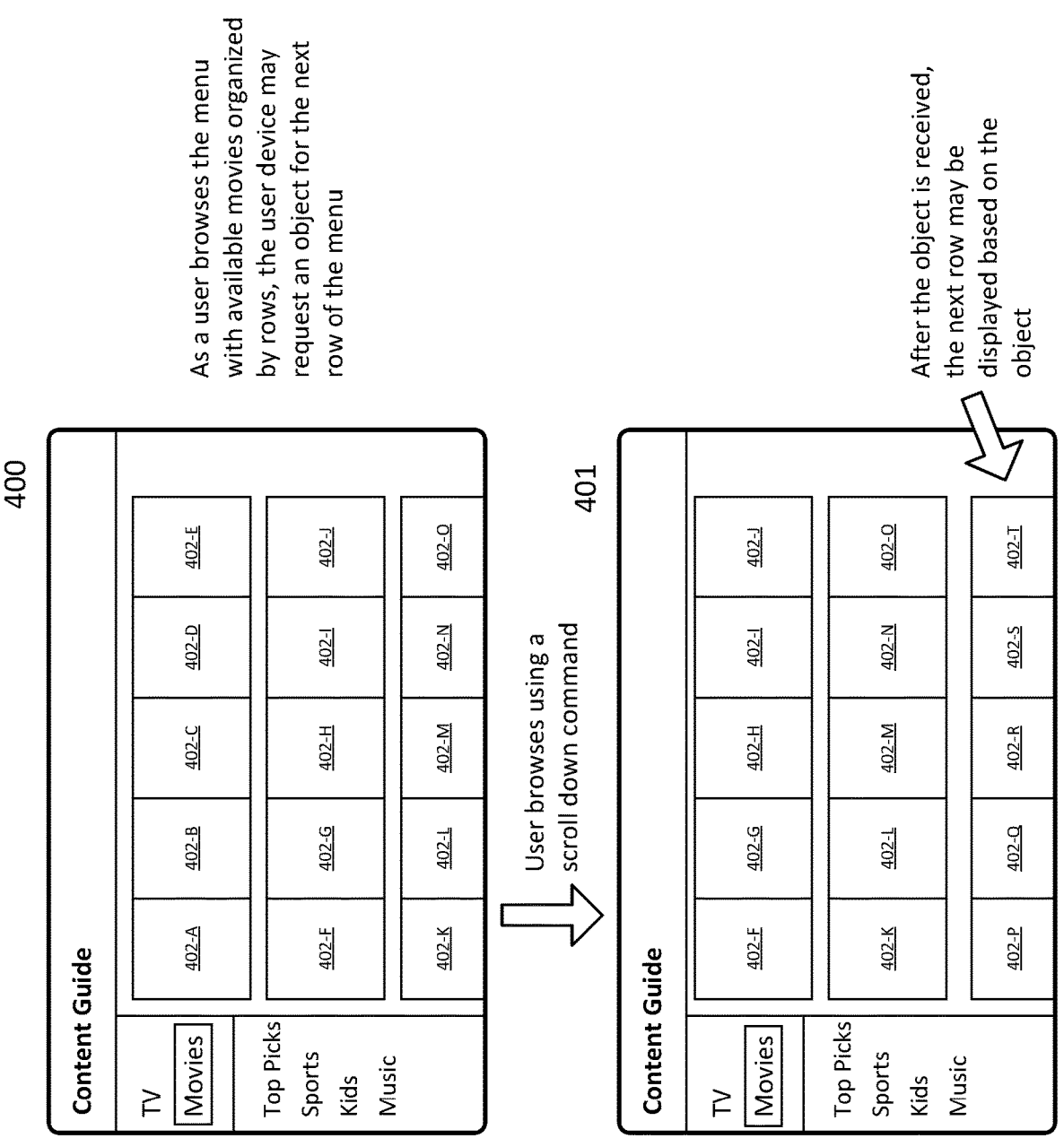
FIG. 4 depicts example user interfaces in accordance with one or more aspects described herein.
Figure 5:
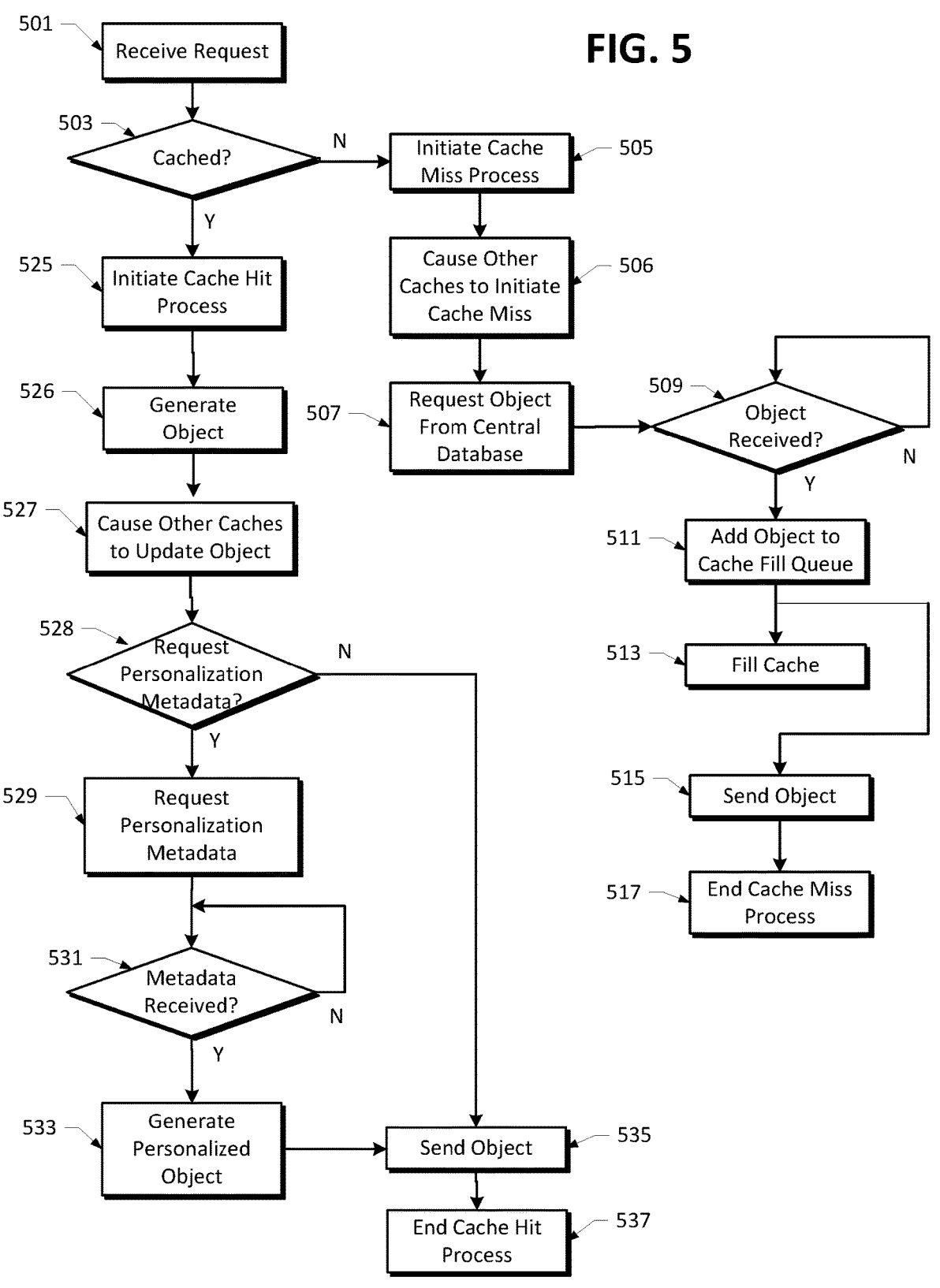
FIG. 5 is a flow chart illustrating an example method that may be performed in accordance with one or more aspects described herein.

While the above discussion of FIG. 2 provides an example of how the cache 206 receives and processes a request for a metadata object from two user devices, additional and/or alternative details will be discussed in connection with FIGS. 4-9 of the present disclosure. For example, FIG. 4 illustrates an example of the types of user interfaces that may be browsed by a user and populated by a computing device based on data of a metadata object. Additionally, the method of FIG. 5 provides additional details regarding the manner in which the cache 206 receives and responds to a request for a metadata object, including additional features for a cache hit and a cache miss.

Figure 3:
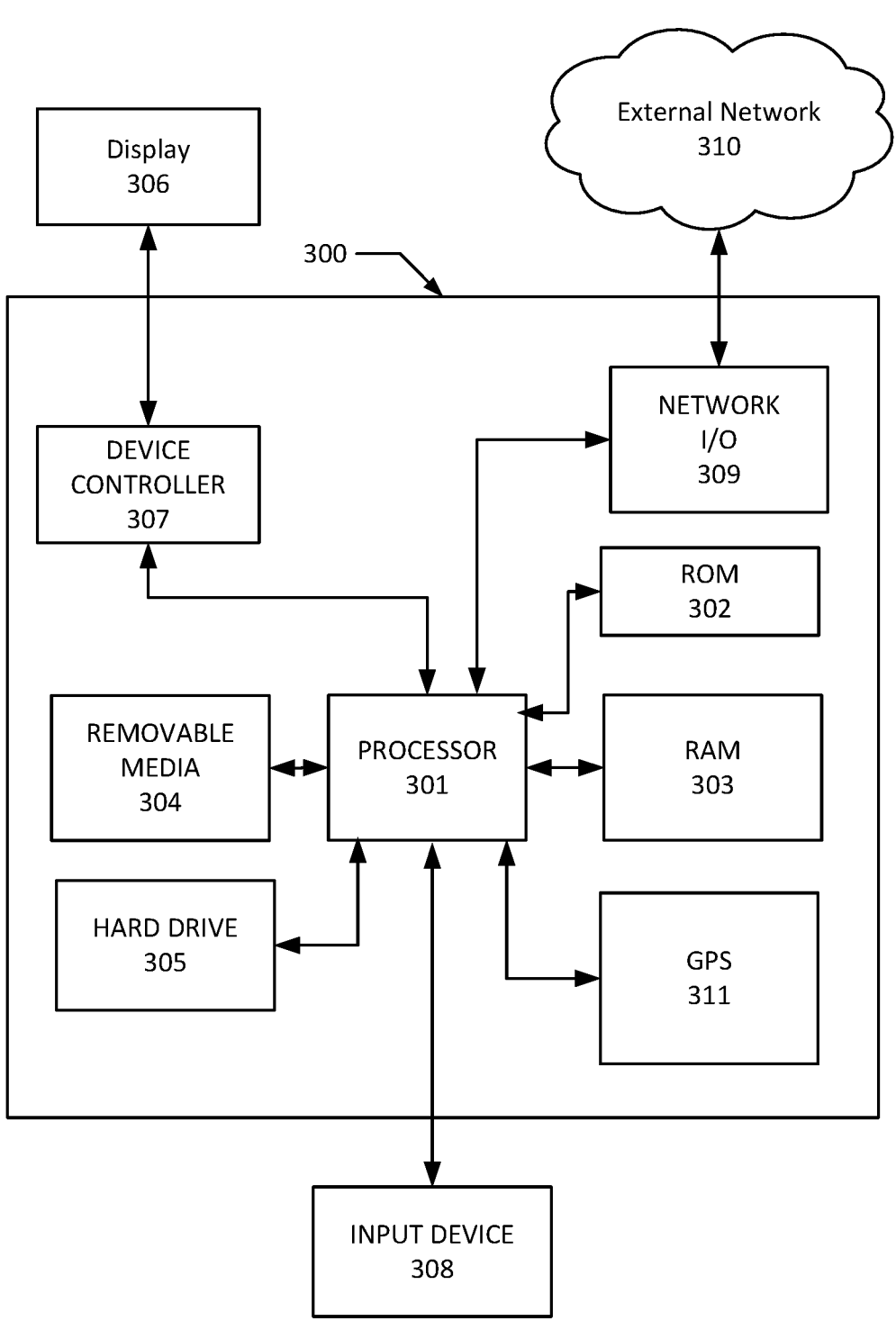
FIG. 3 illustrates an example computing device that can be used to implement any of the methods, servers, entities, and elements discussed herein and shown in the figures, in accordance with one or more aspects described herein.

FIG. 3 illustrates general hardware and software elements of an example computing device 300 that may be used to implement any of the various elements discussed herein and shown in the figures (e.g., the devices, servers, databases, services, or entities depicted in or described in connection with FIGS. 1 and 2). The computing device 300 may include, for instance, one or more processors 301, which may execute computer-readable instructions of a computer program to perform, or otherwise cause to occur, some or all of the features described herein. The instructions may be stored in any one or more types of computer-readable media to configure the operation of the processor 301. For example, the instructions may be stored in one or more memory chips (e.g., a read-only memory (ROM) 302 and/or a random access memory (RAM) 303), a hard disk drive, removable storage media 304 (such as a Universal Serial Bus (USB) drive, FLASH drive, compact disk (CD) or digital versatile disk (DVD), or floppy disk drive), and/or any other desired storage medium. Instructions may also be stored in an attached (or internal) hard drive 305. The computing device 300 may include one or more output devices, such as a display 306 (e.g., an external television) or multiple displays, and may include one or more output device controllers 307, such as a video processor. The computing device 300 may also include or be coupled with one or more user input devices 308, such as a remote control, keyboard, mouse, touch screen, microphone, video camera, etc. The computing device 300 may also include one or more network interfaces, such as a network input/output (I/O) circuit 309 (e.g., a network card) to communicate with an external network 310. The network input/output circuit 309 may be a wired interface, wireless interface, or a combination of the two. In some embodiments, the network input/output circuit 309 may include a modem (e.g., a cable modem), and the external network 310 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 311, which can be configured to receive and process global positioning signals and determine, with possible assistance from an external server and antenna, a geographic position of the device.

Modifications may be made to add, remove, combine, or divide components of the computing device 300 as desired. Additionally, the components illustrated may be implemented using basic computing devices and components, and the same components (e.g., processor 301, ROM storage

302, display 306, etc.) may be used to implement any of the other computing devices and components described herein. For example, the various components herein may be implemented using computing devices having components such as a processor executing computer-executable instructions stored on a computer-readable medium, as illustrated in FIG. 3. Some or all of the entities or features described herein may be software based, and may co-exist in a common physical computing platform (e.g., a requesting entity can be a separate software process and program from a dependent entity, both of which may be executed as software on a common computing device).

One or more aspects of the present disclosure may be embodied in the form of, or otherwise utilize, computer-usable data and/or as computer-executable instructions, such as in one or more program modules, executed by one or more computing devices. Generally, program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

As discussed above, FIGS. 4-9 provide additional and/or alternative details to the example described in connection with FIG. 2. To provide a detailed example of the caching described in present disclosure, FIGS. 4-9 will be discussed in connection with the caching of a JSON object. JSON is an extendible data-interchange format that is easy for humans to read and is used in many different content and/or web services. A JSON object includes an arbitrary number of name/value pairs. Other types of metadata objects could be used in the below example, such as an XML DOM object or a metadata format that can be parsed.

FIG. 4 depicts example user interfaces. In particular, FIG. 4 provides an example interfaces that the users of the user device 202 and the user device 203 of FIG. 2 may browse. As depicted in FIG. 4, interface 400 includes a content guide and is currently displaying a partial listing of movies from a movie catalog.

In some embodiments, each JSON object may be configured to include the data for populating a single row of the interface 400 (e.g., a first JSON object for items 402-A through 402-E, a second JSON object for items 402-F through 402-J, and a third JSON object for items 402-K through 402-0). A JSON object for a content guide menu may include approximately 32 kilobytes of data.

As a user browses the interface 400, the user may press a command to scroll down the content guide. The user device (e.g., the user device 202 or the user device 203 of FIG. 2) may determine which JSON object is needed to display the next row of the content guide and may request the JSON object based on the URLs in the movie catalog. In this example, the URL may cause the user device to transmit the request for the JSON object to a cache (e.g., cache 206 of FIG. 2) located nearer to the user device than a central database (e.g., central database 212 of FIG. 2). After the user device receives a response from the cache with the JSON object, the user device may generate 401, which includes the items of the JSON object, items 402-P through 402-T. The manner in which the cache fulfills the request for the JSON object will be discussed in FIG. 5.

FIG. 5 is a flow chart illustrating an example method that may be performed by the cache (or similarly configured computing device) to retrieve, process and transmit a JSON object as a response to a request for the JSON object from a user device.

At step 501, a request for a JSON object may be received from a user device (e.g., by the cache or similarly configured computing device). The request may take various forms depending on the type of JSON object is needed to update the menu. For example, with respect to the interface of FIG. 4, the cache may receive a request for a menu object, which is for a row items for populating the content guide. Another example of when a user device may request a menu object is if the interface requires data for a next station in an electronic program guide that provides a listing of available television content. The cache, in some instances, may receive a request for a program object if the interface requires data for a single program (e.g., a menu providing information on the program, such as the times for the various showings of the program). The cache, in some other instances, may receive a request for an episode object if the interface requires data for a single episode of a program (e.g., a menu providing information a particular episode of a program, such as text providing a description of the plotlines for the episode). The cache, in yet other instances, may receive a request for a showing object (e.g., a menu providing information on an upcoming showing of a program or an episode of the program). The menu object, program object, episode object and showing object may each be formatted in accordance with JSON.

An example notation for a request for a program object may be, for example, "/address/browse/program" where "address" is the address of the cache and "browse/program" provides an identification of the JSON object being requested (e.g., a type identifier of "browse" to indicate that the type of content being sent is browsing content and a JSON object identifier of "program"). Other types of JSON objects are possible, for example, instead of using a menu object for multiple types of interfaces, each interface may be provided with its own type of request. For example, instead of using a menu object for both movie data (as in FIG. 4) and station data, a station object may be used for station data. Accordingly, the cache may receive a request for a station object and an example notation for such a request may be "/address/browse/station" where "address" is the address of the cache and "station" provides an identification of the JSON object being requested. As another example, the cache may receive a request for a team object and an example notation for such a request may be "/address/browse/team" where "address" is the address of the cache and "team" provides an identification of a JSON object for a particular sports team (e.g., a JSON object with content related to a particular professional football team).

At step 503, it may be determined whether the requested JSON object is stored in the cache. The determination may be a search for a JSON object cached that matches the JSON object identifier included in the request received at step 501. If a matching JSON object is found, the cache may proceed to step 525 to initiate a cache hit process. Otherwise, the cache may proceed to step 505.

At step 505, a cache miss process may be initiated. The cache miss process, which is represented by steps 505-517 of FIG. 5, may be what the cache 206 of FIG. 2 performs to fulfill the request of the user device 202. In some arrangements, the cache miss process may be performed in one or more threads. For example, to initiate the cache miss process, the cache may assign a thread (e.g., from a thread pool of available threads) for performing the cache miss process initiated at step 505. Once initiated, the cache miss process may be performed in parallel with other threads and/or in parallel with steps 501 and 503 of FIG. 5. In this manner, the cache may continue to receive other requests and use other threads for responding to the other request.

At optional step 506, one or more other caches may be caused to initiate a cache miss process for the requested JSON object. For example and as introduced above, the network may include plural caches and each of the plural caches may be in communication with each other. In such arrangements, the cache may transmit one or more messages to other caches in order to cause each of the other caches to initiate a cache miss process for the requested JSON object. Once received by each of the other cache, each cache may perform a process similar to the cache miss process of FIG. 5 (e.g., perform steps 505-517 of FIG. 5, but omit step 506). In some arrangements, transmission of the one or more messages may be part of a Paxos algorithm implemented by the plural caches to ensure the data stored by the plural caches is consistent across the plural caches.

At step 507, as part of the cache miss process, a request for the JSON object may be transmitted to a central database.

At step 509, it may be determined whether the JSON object requested at step 507 has been received by the cache. If the JSON object has not been received, the cache may continue waiting for receipt of the JSON object. If the JSON object has been received, the cache may proceed to step 511.

At step 511, the JSON object may be added to a cache fill queue. For example, because the cache may have multiple cache miss process threads running in parallel at a given time, the cache may utilize a queue that holds the JSON objects that are to be stored in the cache and may further utilize a thread dedicated to processing and storing received JSON objects in the cache (e.g., a cache fill thread). Until the cache fill thread is ready to process and store another JSON object, the JSON object may remain in the queue. In such embodiments, the cache miss process may involve at least two threads: one for requesting the JSON object from the central database and sending the response to the user device (e.g., steps 505-511, 515 and 517 of FIG. 5); and a second for filling the cache with any JSON object in the cache fill queue (e.g., step 513 of FIG. 5). Once the JSON object is added to the cache fill queue, the thread assigned to the cache miss process may proceed to step 515.

At step 515, the JSON object may be transmitted to the user device as a response to the request received at step 501.

At step 517, the cache miss process may end. In some embodiments, ending the cache miss process may include releasing the thread assigned to perform the cache miss process.

Figure 6:
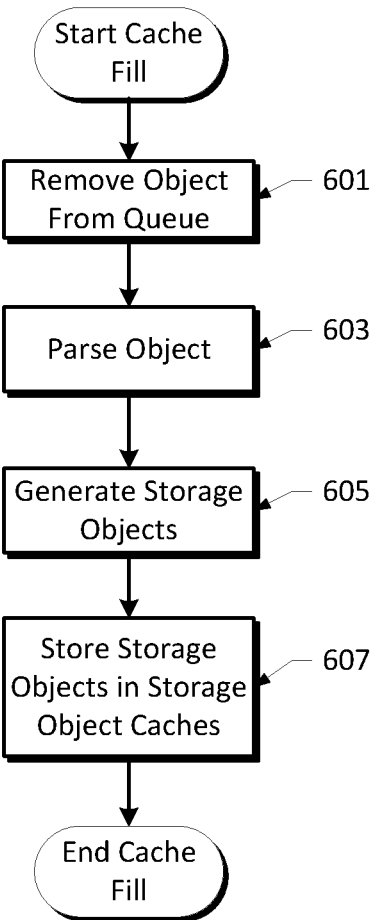
FIG. 6 is a flow chart illustrating another example method that may be performed in accordance with one or more aspects described herein.

At step 513, the cache may be filled with the JSON object. The cache, however, may perform additional processing on the JSON object before storing it in the cache. FIG. 6 is a flow chart illustrating an example method for processing a JSON object for storage into a cache. In particular, the example method of FIG. 6 may be performed by a cache fill thread, as discussed above in connection with step 511 of FIG. 5.

At step 601, the JSON object may be removed from the cache fill queue. JSON objects may be removed from the cache fill queue in a first-in-first-out fashion.

At step 603, the JSON object may be parsed, or otherwise processed, into different portions. For example, the content of a JSON object may include one or more portions of static data and one or more portions of dynamic data, and the cache may parse the JSON object to separate the static data portions from the dynamic data portions (e.g., separate name/value pairs considered to be static from name/value pairs considered to be dynamic). Static data can be defined as data that does not change within the JSON object over time or data that has a longer lifetime than the dynamic data. In connection with the example user interfaces of the present disclosure, an example of static data may include the title or name of the content being described by the JSON object (e.g., the channel name, the program name, the movie title, and other types of identifiers). Dynamic data can be defined as data that does change within the JSON object over time or data that has a shorter lifetime than the static data. In connection with the example user interfaces of the present disclosure, examples of dynamic data may include a date or time for a showing of a piece of content, availability or expiration dates for a piece of content, and a rating for a piece of content (e.g., a review score taken from a review website). Another example of static and dynamic data relates to the differences between users or user devices. For example, if a particular name/value pair from a JSON object is the same for all users or user devices, or is the same for at least a threshold number of users or user devices, that name/value pair may be considered static. If a particular name/value pair from a JSON object is different for each user or user device, or is the same for less than all or the threshold number of users or user devices, that name/value pair may be considered dynamic. In general, the types of name/value pairs that are static or dynamic are predetermined for a JSON object (e.g., an operator of the service provider provides configuration data with a mapping of possible names for a JSON object to indicate whether each name is static or dynamic).

To provide additional examples of the types of name/value pairs of a JSON object that are static or dynamic, a sample JSON object is provided in Table 1. Throughout the sample JSON object of Table 1, portions of the JSON object that can be considered static are emphasized with bolding and underlining, while portions of the JSON Object that can be considered dynamic are emphasized with italics.

TABLE 1

{
  *"query" : "menu.id=6388915492514549170&items.paging=1-*
*4&schema=v1 &showings=1 &user.atags=vod$653707451896032111O,vod$88757443568642*
*43110,linear$7444042768941558110&filters=tag.type:movie AND catalog.type:vod AND*
*tag.audience:kids AND (entity.tags:m$5628801549346379127 OR*
*entity.tags:m$9071838912290610118) AND*
*entity.tags:m$8587453217889459118&entity.sort=browse&fields=program.all",*
  *"sessionId" : "comcast:compass:session:5833595742631840643",*

TABLE 1-continued

```
"menuItems" : [ {
    "kind" : "ProgramInfo",
    "language" : "eng",
    "duration" : 6780,
    "year" : 2013,
    "category" : "Movie",
    "tags" : [ 7366083161963150118, 8749312209550148118, 9026984464688979118,
7811580846012173118, 6077303007413263118, 9162924514733155118,
5978724735878672118, 7296291376209046118, 6440210671371186118,
9128161535579298127, 7708283281800598118, 4845086526053001118,
7954192298395703118, 7468090638146999147, 5707764083183839118,
5777270526409243148, 7503066269443505118, 5628801549346379127,
6377446343644061118, 5935855895617349118, 5182327145133088127,
4864292882367967118, 8619266484330435118, 6988172973376731127,
7457315684437338127, 8587453217889459118, 6122104084092645118,
7368682826357220118, 5645505084988596118, 8956924182586035118,
5555541238790621118, 7713248046765393118, 7077584652978633118,
7075000520560192118, 8986627428212420147, 8395156493543108118,
5309109045454230118, 8121300199517936118, 6869480711474139118,
5445333978547304118, 6366574615158161118, 6622467838664278118,
6651751100299769118 ],
    "showings" : [ {
        "kind" : "MediaInfo",
        "provider" : "HBO_3D_HD",
        "duration" : 6883,
        "newUntil" : 1386460800000,
        "audioType" : "Dolby 5.1",
        "price" : 0.0,
        "availableDate" : 1385856000000,
        "expirationDate" : 1391212799000,
        "lastChanceFrom" : 1390607999000,
        "purchasable" : false,
        "ultraViolet" : false,
        "mediaId" : 1093718771,
        "hd" : true,
        "threeD" : true,
        "trickModesRestricted" : "false",
        "entitlementIds" : [ "comcast:compass:entitlement:8278387124548074141" ],
        "mediaGuid" : "hbo-hd.comHBTT0000000005509612-HBTM0000000005509612",
        "csgiProductId" : "n/a",
        "providerCompanyId" : "comcast:compass:company:5232923399725817105",
        "programId" : "comcast:compass:program:8844719539422414112",
        "cc" : false
    } ],
    "newUntil" : 1386460800000,
    "audience" : "kids",
    "starRating" : 3,
    "synopsis" : "Brave farmer Jack ventures into the land of giants on a mission to
rescue an abducted princess, risking a tenuous truce between humans and giants in the
process.",
    "title" : "Jack the Giant Slayer",
    "availableDate" : 1385856000000,
    "expirationDate" : 1391212799000,
    "lastChanceFrom" : 1390607999000,
    "est" : false,
    "programType" : "Movie",
    "programId" : "comcast:compass:program:8844719539422414112",
    "score" : 0.82533,
    "images" : [ {
        "width" : 144,
        "height" : 192,
        "url" : "http://compass-
images.comcast.net/ccp_img/pkr_prod/VMS_POC_Image_Ingest/30/452/media-
4712363772052019014-rovi_3x4_1200x1600_1200x1600_30870971.jpg",
        "mainImageTypeId" :
"comcast:compass:mainImageTypeId:4678140478765128126",
        "alias" : "thumb",
        "groupIds" : [ "comcast:compass:imageTypeGroupId:6209548755931249161" ],
        "requiresAttribution" : false
    }, {
        "width" : 576,
        "height" : 432,
        "url" : "http://compass-
images.comcast.net/ccp_img/pkr_prod/VMS_POC_Image_Ingest/23/210/media-
5956493878525594799-rovi_4x3_1200x900_1200x900_23283629.jpg",
        "mainImageTypeId" :
"comcast:compass:mainImageTypeId:5360592997854839126",
        "alias" : "main",
        "groupIds" : [ "comcast:compass:imageTypeGroupId:6209548755931249161" ],
        "requiresAttribution" : false
```

```
     } ],
  "ratings" : [ {
     "rating" : "PG13",
     "subRatings" : [ "SL", "V" ]
  } ],
  "relevance" : [ {
     "type" : "fanScore",
     "source" : "rottenTomato",
     "score" : 56.0
  }, {
     "type" : "criticScore",
     "source" : "rottenTomato",
     "score" : 52.0
  } ],
  "companyIds" : [ "comcast:compass:company:5232923399725817105" ]
}, {
  "kind" : "ProgramInfo",
  "language" : "eng",
  "duration" : 5760,
  "year" : 1947,
  "category" : "Movie",
  "tags" : [ 6918384653328004118, 4660289078001113118, 9071838912290610118,
5826843107767370118, 7636954402576471118, 4878362194448234118,
5031211680633322118, 8170400020729199118, 4684537098364160118,
6597449446839632118, 5628801549346379127, 8857237796671318118,
7924150095953510118, 8887894506673233147, 8087033377767804118,
7713248046765393118, 5555541238790621118, 6419625513889000118,
8197070917578284118, 8962731611981259118, 8798016706944022118,
9016587993063058147, 6286490757642527118, 8395156493543108118,
6889093933052831118, 8900992423502404118, 8409768675908119118,
9053455191547954127, 6651751100299769118, 5447135801760739118,
9026984464688979118, 5232315962878412118, 5053413273683643118,
8992961192424336118, 7121764907511866118, 9128161535579298127,
6176798715212846127, 7954192298395703118, 9128232526777345147,
7082599486482542118, 8865808339374381118, 6258099583916448118,
4864292882367967118, 5182327145133088127, 5561937844145102118,
8587453217889459118, 9015786451336629118, 7457315684437338127,
8706682065528919118, 5154196943455023118, 7466467062157458118,
8734869884494354127, 6009929420856802118, 5524655153202646118,
5981466310204415118, 7366886431725997118, 8364662325077735118,
6121610065543194118, 7337103048295760147, 9197555858000007118 ],
  "showings" : [ {
     "kind" : "MediaInfo",
     "provider" : "FOX_HD",
     "duration" : 5784,
     "newUntil" : 1353369600000,
     "audioType" : "Dolby Digital",
     "price" : 3.99,
     "availableDate" : 1352764800000,
     "expirationDate" : 1388534399000,
     "lastChanceFrom" : 1387929599000,
     "purchasable" : false,
     "ultraViolet" : false,
     "mediaId" : 1027657770,
     "hd" : true,
     "threeD" : false,
     "trickModesRestricted" : "false",
     "entitlementIds" : [ "comcast:compass:entitlement:5259266555811826141" ],
     "mediaGuid" : "indemand.comINTL1112000055467789-INMV1112000055467789",
     "csgiProductId" : "n/a",
     "providerCompanyId" : "comcast:compass:company:8463172568858291105",
     "programId" : "comcast:compass:program:4825275992439113112",
     "cc" : true
  } ],
  "newUntil" : 1353369600000,
  "audience" : "kids",
  "starRating" : 4,
  "synopsis" : "Edmund Gwenn won a Best Supporting Actor Oscar for his portrayal of
a department-store Santa Claus who runs afoul of the store's nasty in-house psychiatrist
and is forced to go on trial to prove he's the real Kris Kringle. A Best Picture nominee,
the film's director George Seaton won an Oscar for his script.",
  "title" : "Miracle on 34th Street",
  "availableDate" : 1352764800000,
  "expirationDate" : 1388534399000,
  "lastChanceFrom" : 1387929599000,
  "est" : false,
  "programType" : "Movie",
  "programId" : "comcast:compass:program:4825275992439113112",
  "score" : 0.78768,
  "images" : [ {
```

TABLE 1-continued

"width" : 576,
"height" : 432,
"url" : "http://compass-
images.comcast.net/ccp_img/pkr_prod/VMS_POC_Image_Ingest/9/702/1321984991682_
Miracle_on_34th_Street_Overlay_1024_768_1024x768_19775626.jpg",
    "mainImageTypeId" :
"comcast:compass:mainImageTypeId:5360592997854839126",
        "alias" : "main",
        "groupIds" : [ "comcast:compass:imageTypeGroupId:6209548755931249161" ],
        "requiresAttribution" : false
}, {
        "width" : 144,
        "height" : 192,
        "url" : "http://compass-
images.comcast.net/ccp_img/pkr_prod/VMS_POC_Image_Ingest/9/702/1321984991653_
Miracle_on_34th_Street_Overlay_768_1024_768x1024_19772532.jpg",
        "mainImageTypeId" :
"comcast:compass:mainImageTypeId:4678140478765128126",
        "alias" : "thumb",
        "groupIds" : [ "comcast:compass:imageTypeGroupId:6209548755931249161" ],
        "requiresAttribution" : false
} ],
"ratings" : [ {
        "rating" : "NR"
} ],
"originalAirDate" : 1292025600000,
"relevance" : [ {
        "type" : "criticScore",
        "source" : "rottenTomato",
        "score" : 96.0
}, {
        "type" : "fanScore",
        "source" : "rottenTomato",
        "score" : 87.0
} ],
"companyIds" : [ "comcast:compass:company:8463172568858291105" ]
}, {
"kind" : "ProgramInfo",
"language" : "eng",
"duration" : 5400,
"year" : 2003,
"category" : "Movie",
"tags" : [ 7239845129597044118, 5566520314509417118, 5112731558181081118,
7460390144705475118, 7773100559229266118, 5628801549346379127,
6706118117291438118, 8520317871586659118, 8887894506673233147,
5645505084988596118, 8956924182586035118, 7713248046765393118,
5126005102109102118, 5212969310556021118, 6346288994183576118,
4950271432664171118, 6661411772425948118, 6651751100299769118,
5195669233743811118, 9026984464688979118, 7811580846012173118,
5053413273683643118, 5978724735878672118, 9128161535579298127,
6726650875761813118, 7631094881681040118, 7954192298395703118,
9128232526777345147, 7553983392282839118, 7177976191391122118,
6988172973376731127, 8379052327605417118, 8587453217889459118,
5541717254616184118, 7466467062157458118, 6616584436088343127,
8734869884494354127, 6009929420856802118, 5900083937564180118,
8986627428212420147, 5309109045454230118, 5264318456903993118,
5779998975641428118, 7860460171115174118, 6707805994052919118,
7932957453171937118, 6622467838664278118, 7337103048295760147,
6993900999482825147 ],
"showings" : [ {
"kind" : "MediaInfo",
"provider" : "WARNER_BROS",
"duration" : 5521,
"newUntil" : 1244419200000,
"audioType" : "Dolby Digital",
"price" : 2.99,
"availableDate" : 1243814400000,
"expirationDate" : 1893455999000,
"lastChanceFrom" : 1892851199000,
"purchasable" : false,
"ultraViolet" : false,
"mediaId" : 37046949,
"hd" : false,
"threeD" : false,
"trickModesRestricted" : "false",
"entitlementIds" : [ "comcast:compass:entitlement:5259266555811826141" ],
"mediaGuid" : "indemand.comINTL0609000006766673-INMV0609000006766673",
"csgiProductId" : "n/a",
"providerCompanyId" : "comcast:compass:company:5470883989996030105",
"programId" : "comcast:compass:program:8428313894857964112", "cc" : true
} ],
"newUntil" : 1244419200000,
"audience" : "kids",
"starRating" : 3,
"synopsis" : "Daffy Duck and a studio security guard (Brendan Fraser) get_mixed_up
in a spy caper in Joe Dante's delightful mix of live action and animation. Steve Martin,
Timothy Dalton. Look for cameos by Peter Graves, Matthew Lillard, director Roger
Corman and NASCAR's Jeff Gordon. Cartoon cameos by Scooby-Doo and Shaggy.
Fraser also lends his voice to the Tasmanian Devil.",
    "title" : "Looney Tunes: Back in Action",
    "availableDate" : 1243814400000,
    "expirationDate" : 1893455999000,
    "lastChanceFrom" : 1892851199000,
    "est" : false,
    "programType" : "Movie",
    "programId" : "comcast:compass:program:8428313894857964112",
    "score" : 0.73965,
    "images" : [ {
        "width" : 144,
        "height" : 192,
        "url" : "http://compass-
images.comcast.net/ccp_img/pkr_prod/VMS_POC_Image_Ingest/8/948/1317928308276_
rovil_Overlay_768_1024_768x1024_19942324.jpg",
        "mainImageTypeId" :
"comcast:compass:mainImageTypeId:4678140478765128126",
        "alias" : "thumb",
        "groupIds" : [ "comcast:compass:imageTypeGroupId:6209548755931249161" ],
        "requiresAttribution" : false
    }, {
        "width" : 576,
        "height" : 432,
        "url" : "http://compass-
images.comcast.net/ccp_img/pkr_prod/VMS_POC_Image_Ingest/37/457/Looney-Tunes-
Back-in-Action_CR_1536x1152_38256514.jpg",
        "mainImageTypeId" :
"comcast:compass:mainImageTypeId:5360592997854839126",
        "alias" : "main",
        "groupIds" : [ "comcast:compass:imageTypeGroupId:6209548755931249161" ],
        "requiresAttribution" : false
    } ],
    "ratings" : [ {
        "rating" : "PG",
        "subRatings" : [ "SL" ]
    } ],
    "relevancey : [ {
        "type" : "fanScore",
        "source" : "rottenTomato",
        "score" : 50.0
    }, {
        "type" : "criticScore",
        "source" : "rottenTomato",
        "score" : 56.0
    } ],
    "companyIds" : [ "comcast:compass:company:5470883989996030105" ]
}, {
    "kind" : "ProgramInfo",
    "language" : "eng",
    "duration" : 4800,
    "year" : 1999,
    "category" : "Movie",
    "tags" : [ 9045589778984226118, 9026984464688979118, 9071838912290610118,
5053413273683643118, 7811580846012173118, 6077303007413263118,
5978724735878672118, 5383737076171488118, 6440210671371186118,
9128161535579298127, 7460390144705475118, 7954192298395703118,
7468090638146999147, 9128232526777345147, 6198820372101945118,
5972938280801790118, 5628801549346379127, 5182327145133088127,
4864292882367967118, 6464112799426057118, 9058420377372229118,
6988172973376731127, 8587453217889459118, 8887894506673233147,
7466467062157458118, 7018706630738586118, 5645505084988596118,
7713248046765393118, 8734869884494354127, 7698170510351307118,
6009929420856802118, 8141282175134695118, 8945199239362788118,
8986627428212420147, 5309109045454230118, 5959382579391668118,
5270563043593708118, 5212969310556021118, 5779998975641428118,
6869480711474139118, 7932957453171937118, 6622467838664278118,
7337103048295760147, 6651751100299769118, 9197555858000007118,
8430446483384510118 ],
    "showings" : [ {
        "kind" : "MediaInfo",
        "provider" : "ENCORE_HD",

```
            "duration" : 4720,
            "newUntil" : 1383868800000,
            "audioType" : "Dolby 5.1",
            "price" : 0.0,
            "availableDate" : 1383264000000,
            "expirationDate" : 1391126399000,
            "lastChanceFrom" : 1390521599000,
            "purchasable" : false,
            "ultraViolet" : false,
            "mediaId" : 1089030856,
            "hd" : true,
            "threeD" : false,
            "trickModesRestricted" : "false",
            "entitlementIds" : [ "comcast:compass:entitlement:5905384582110578141" ],
            "mediaGuid" : "starzencore.comTITL0450000000910002-
MOVE0450000000910002",
            "screenFormat" : "Widescreen",
            "csgiProductId" : "n/a",
            "providerCompanyId" : "comcast:compass:company:5390126448038602105",
            "programId" : "comcast:compass:program:7678523886633834112",
            "cc" : true
        } ],
        "newUntil" : 1383868800000,
        "audience" : "kids",
        "starRating" : 2,
        "synopsis" : "Film adaptation of the animated TV series stars Matthew Broderick as a
security guard who, after an accident, becomes a bionic crimefighter and goes up against
the villainous Claw (Rupert Everett). Brenda: Joely Fisher. Penny: Michelle
Trachtenberg. Mayor Wilson: Cheri Oteri. Kramer: Andy Dick. Chief Quimby: Dabney
Coleman. Brain: Don Adams.",
        "title" : "Inspector Gadget",
        "availableDate" : 1383264000000,
        "expirationDate" : 1391126399000,
        "lastChanceFrom" : 1390521599000,
        "est" : false,
        "programType" : "Movie",
        "programId" : "comcast:compass:program:7678523886633834112",
        "score" : 0.73503,
        "images" : [ {
            "width" : 144,
            "height" : 192,
            "url" : "http://compass-
images.comcast.net/ccp_img/pkr_prod/VMS_POC_Image_Ingest/8/37/InspectorGadget-
PosterArt_2250x3000_20358806.jpg",
            "mainImageTypeId" :
"comcast:compass:mainImageTypeId:4678140478765128126",
            "alias" : "thumb",
            "groupIds" : [ "comcast:compass:imageTypeGroupId:6209548755931249161" ],
            "requiresAttribution" : false
        }, {
            "width" : 576,
            "height" : 432,
            "url" : "http://compass-
images.comcast.net/ccp_img/pkr_prod/VMS_POC_Image_Ingest/21/427/media-
2290004896094006679-
inspectorgadget_studio_2048x1536_v201304081911_2048x1536_21574700.jpg",
            "mainImageTypeId" :
"comcast:compass:mainImageTypeId:5360592997854839126",
            "alias" : "main",
            "groupIds" : [ "comcast:compass:imageTypeGroupId:6209548755931249161" ],
            "requiresAttribution" : false
        } ],
        "ratings" : [ {
            "rating" : "PG",
            "subRatings" : [ "SL", "V" ]
        } ],
        "relevance" : [ {
            "type" : "fanScore",
            "source" : "rottenTomato",
            "score" : 18.0
        }, {
            "type" : "criticScore",
            "source" : "rottenTomato",
            "score" : 21.0
        } ],
        "companyIds" : [ "comcast:compass:company:5390126448038602105" ]
    } ],
    "statusCode" : "200",
    "entryCount" : 129,
    "paging" : {
```

TABLE 1-continued

```
    "itemsPerPage" : 4,
    "startIndex" : 1
  },
  "qtime" : "53.0",
  "statusMessage" : "Success"
}
```

After parsing the JSON object into different portions of static and dynamic data, some embodiments (not shown in FIG. 6) may store the static portion in a static data cache and the dynamic portion in a dynamic data cache. The static data cache and the dynamic data cache may both be indexed by identifiers of the JSON objects, so that the portions may be quickly retrieved during a cache hit process. Alternatively, the portions of static and dynamic data may be further processed and then stored. One or more of such embodiments are described in connection with steps 605 and 607 of FIG. 6.

At step 605, one or more storage objects may be generated based on the static and dynamic data portions that resulted from the parsing of step 603. For example, in the present example being described throughout FIGS. 4-9, a user device may be able to request certain types of JSON objects dependent on what is needed to update the menu, such as a menu object, program object, showing object and episode object. Accordingly, the cache may generate one or more storage objects based on the types of JSON objects that can be requested, such as a menu object, program object, showing object, and episode object.

In some arrangements, a menu object may include a listing of program objects. A program object may include a listing of episode objects and a listing of showing objects. A program object may further include data from the static data portions, such as a program identifier; and data from the dynamic data portions, such as one or more scores for the program (e.g., a score used for ranking the program among other programs), one or more availability or expiration dates for the program, and the like. A showing object may include data from the static data portions, such as a showing identifier; and data from the dynamic data portions, such as one or more availability or expiration dates for the showing, a price for the showing (e.g., a price for the user to purchase the showing), and the like. An episode object may include a listing of showing objects. An episode object may further include data from the static data portions, such as an episode identifier; and data from the dynamic data portions, such as one or more availability or expiration dates for the episode, Boolean flags for determining whether the episode is available on demand, and the like.

Figure 7:
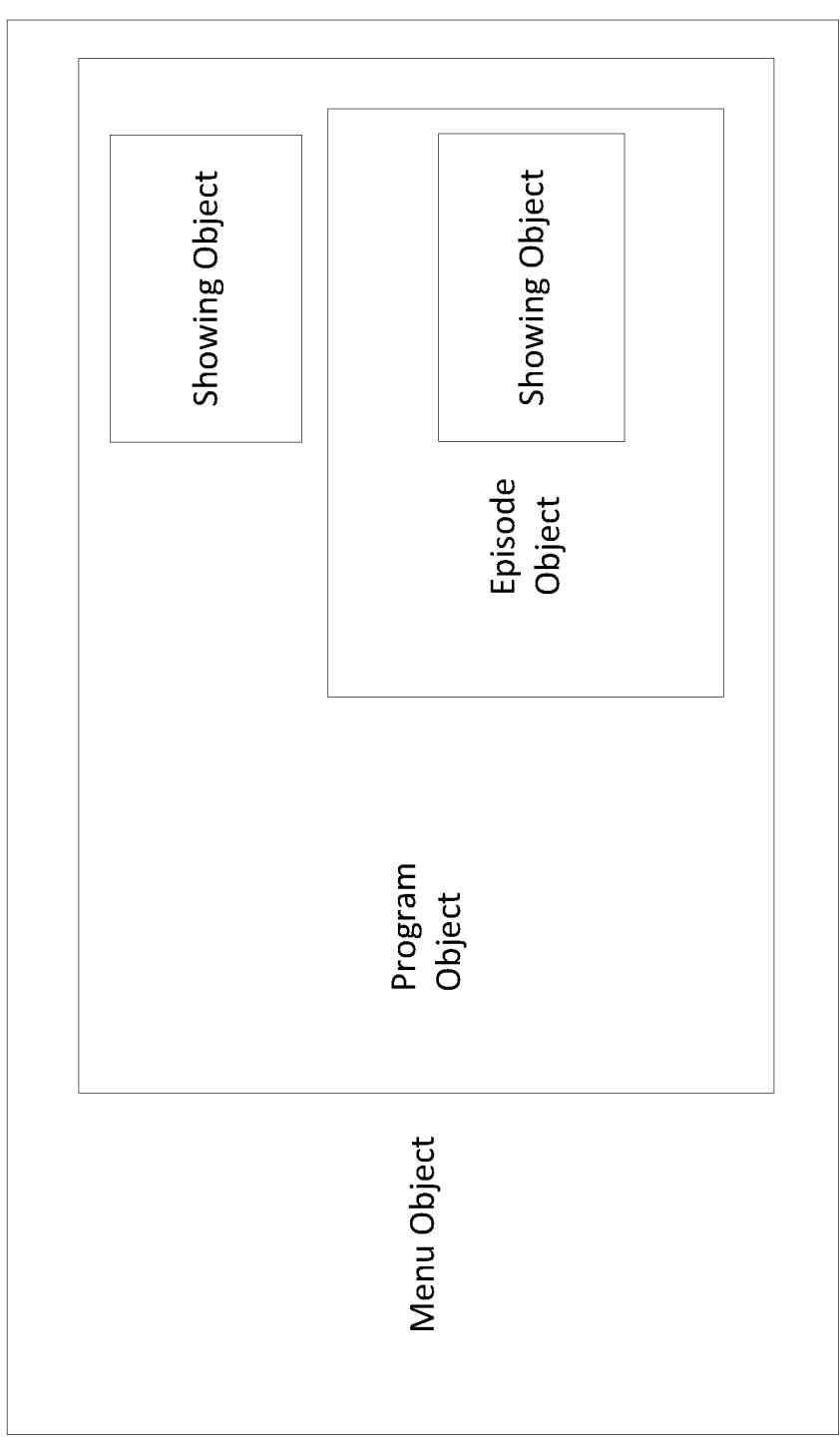
FIG. 7 depicts an illustrative relationship between different types of a metadata object in accordance with one or more aspects described herein.

Additionally, the types of storage objects that can be generated may further depend on the content of the JSON object that is being placed in to the cache. For example, if the JSON object being placed in the cache is a menu object, the cache may generate a menu object, one or more program objects, one or more showing objects, and one or more episode objects. The number of program objects, showing objects and episode objects that are generated may depend on the exact content of the JSON object. As another example, if the JSON object being placed in the cache is a showing object, the cache may generate only a showing object. FIG. 7 provides an illustrative depiction of the relationship between menu objects, program objects, showing objects, and episode objects. Indeed, as illustrated in FIG. 7, a menu object may include program objects, showing objects and episode objects; a program object may include showing objects and episode objects; and an episode object may include showing objects.

In some embodiments, the processes described at steps 603 and 605 may be performed in conjunction with each other (e.g., generate the storage object while parsing the JSON object, such as by parsing a first name/value pair and placing the value of that name/value pair into the appropriate storage object(s)).

At step 607, one or more storage objects may be stored into one or more storage object caches. For example, each type of storage object may be stored into its own cache (e.g., a menu object may be stored into a menu cache; a program object may be stored in a program cache; a showing object may be stored in a showing cache; and an episode object may be stored in an episode cache). Each cache may be indexed according to the object's identifier (e.g., the menu cache may be indexed by a menu identifier; a showing cache may be indexed by a showing identifier; a program cache may be indexed by a program identifier; and an episode cache may be indexed by an episode identifier). In this manner, when the cache attempts to fulfill a later request for a JSON object, the cache can search a particular cache for the JSON object using the object's identifier (e.g., search the menu cache using the menu identifier of the requested menu object; search the program cache using the program identifier of the requested program identifier, and the like).

Additionally, objects may be stored to facilitate later retrieval. For example, a storage object may be stored in a tree structure, such as a B+ tree. Moreover, each storage object cache may utilize its own tree structure (e.g., the menu cache may store objects to the physical disk using a first tree structure and the program cache may store objects to the physical disk using a second tree structure).

Figure 8:
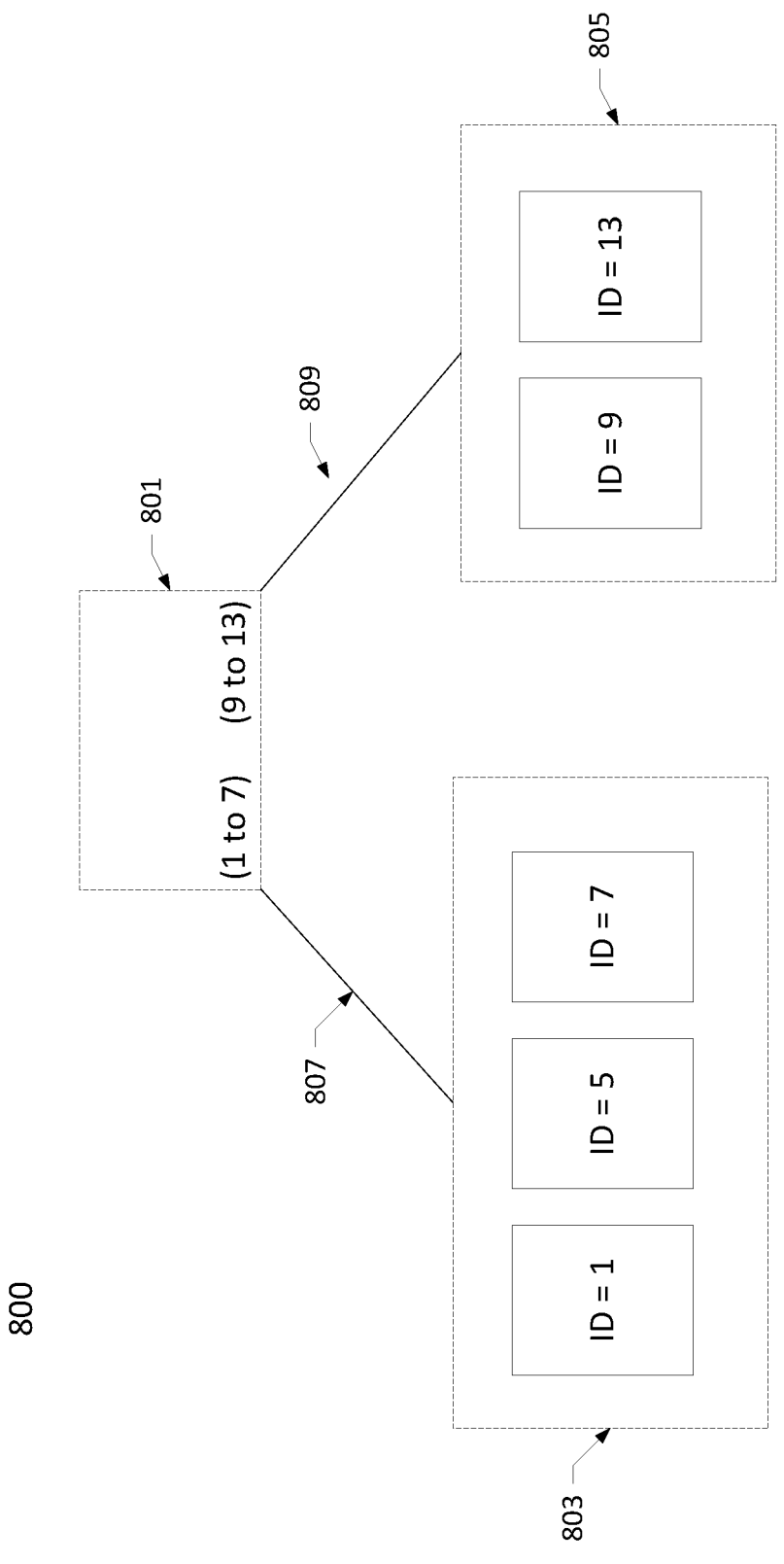
FIG. 8 is an illustration of traversing a tree structure in accordance with one or more aspects described herein.

A B+ tree allows for a quick traversal even when a large number of objects are stored within the tree. In accordance with the example discussed throughout FIGS. 4-9, a B+ tree may logically place each object at the bottom of the tree and the objects may be properly sorted (e.g., according to the numeric value of the identifier used for the storage object cache, from lowest to highest). The B+ tree may logically have only a single node until a maximum number of objects have been indexed to the node. When the maximum number of objects is reached for a node, the node may split into two child nodes and the two nodes may be linked to a new parent node, which is logically placed one level above the two child nodes in the B+ tree. FIG. 8 illustrates an example of a B+ tree with two logical levels and a maximum of 3 objects per node. The B+ tree 800 of FIG. 8 includes parent node 801, and two child nodes 803 and 805, which are logically linked to the parent node 801 via the links 807 and 809. As depicted in FIG. 8, the B+ tree 800 stores 5 storage objects sorted by the identifier of each storage object. Accordingly, child node 803 includes the storage objects with identifiers of 1, 5 and 7; and child node 805 includes the storage objects with identifiers of 9 and 13. Further details of FIG. 8, such as how the B+ tree 800 is traversed, will be discussed in connection with the cache hit process of FIG. 5.

After storing the one or more storage objects, the cache fill process may end or, in some instances, the cache fill thread may repeat the cache fill process illustrated by FIG. 6 if the cache fill queue includes additional JSON objects that need to be stored.

Referring again to the example method of FIG. 5, at step 525, a cache hit process may be initiated. The cache hit process, which is represented by steps 525-537 of FIG. 5, may be what the cache 206 of FIG. 2 performs to fulfill the request of the user device 203. In some arrangements, the cache hit process may be performed in one or more threads. For example, to initiate the cache hit process, the cache may assign a thread for performing the cache hit process initiated at step 525. Once initiated, the cache hit process may be performed in parallel with other threads and/or in parallel with steps 501 and 503 of FIG. 5.

At step 526, the JSON object may be generated based on the cache. For example, in embodiments where a static and dynamic data portions are stored in separate caches, the static and dynamic caches may be searched and the static and dynamic data portions may be retrieved from the respective caches. Once retrieved, the JSON object may be generated based on the retrieved static and dynamic data portions (e.g., appending the portions together to form the JSON object).

As another example, generating the JSON object may include searching one or more of the storage object caches for one or more storage objects that comprise the requested JSON object. For example, if the JSON object requested at step 501 is for a menu object, the menu cache may be searched for the requested JSON object. The program cache, episode cache or showing cache may similarly be searched if needed to generate the requested JSON object.

Searching a storage object cache (or a cache storing static or dynamic data portions) may include traversing a B+ tree. An example of traversing a B+ tree can be described in connection with the example B+ tree of FIG. 8. In this example of traversing the B+ tree of FIG. 8, the requested JSON object has an identifier of 5. To locate that object in the B+ tree, the traversing process begins at parent node 801. Because this is a parent node and all objects are located at the bottom of the B+ tree, the index ranges are analyzed to determine which link to follow. Because the requested object has an identifier of 5, link 807 is followed to child node 803. Child node 803 includes the object with the identifier of 5, so that storage object is returned and the traversal is completed.

It is noted that the example B+ tree of FIG. 8 includes a maximum of three objects per node with only 5 stored objects, which results in a tree with only two levels. To traverse a tree with two levels, only one hop is needed (e.g., a hop from the parent node 801 to one of the child nodes 803 or 805). In some embodiments, the maximum number of objects per node may be greater than three, and having a greater number of objects per node may have a great impact on the number of levels in the B+ tree. For example, if the B+ tree has a maximum of 100 objects, six levels of the B+ tree may be used to access billions of stored objects. Further, only 5 hops would be needed to access any particular one of the billions of stored objects.

In some instances, the storage object may not be formatted in a JSON format. Accordingly, the cache may generate the JSON object based on the storage object. For example, a storage object may include a number of values for the JSON object, but not include the name for the name/value pair. The values of a storage object may be mapped to the name of the name/value pair and included in the JSON object. The mapping may be repeated for each value stored in the storage object.

As discussed above, the various types of storage objects may include different values from the other types of storage objects. Accordingly, the mapping process may result in a JSON object that includes different name/value pairs (e.g., a set of name/value pairs specific for a menu object; a set of name/value pairs specific for a program object; a set of name/value pairs specific for an episode object; and a set of name/value pairs specific for an episode object). For example, a JSON object generated based on a menu object may include name/value pairs for each program object in the listing of program objects. A JSON object generated based on a program object may include a name/value pair for a program identifier, a name/value pair for one or more scores for the program, and a name value pair for one or more availability or expiration dates for the program. A JSON object generated based on a showing object may include a name/value pair for a showing identifier, a name/value pair for one or more availability or expiration dates for the showing, and a name/value pair for a price for the showing. A JSON object generated based on an episode object may include name/value pairs for each showing object in a listing of showing objects, a name/value pair for an episode identifier, a name/value pair for one or more availability or expiration dates for the episode, and a name/value pair for one or more Boolean flags for determining whether the episode is available on demand. In some instances, the JSON object of Table 1 may be the result upon generating the JSON object based on a retrieved menu object.

Once the JSON object has been generated, the cache may determine whether to update the dynamic data of the JSON object. For example, in some embodiments, the cache may transmit an index status check to a central database each time a cache hit process is performed. An index may change based on a change in a JSON object, such as when a piece of on-demand content changes in price or some other attribute of the JSON object changes. If the index has changed, the cache may request an update to the dynamic portions of the JSON object. In some instances, the cache may receive a response from the central database with one or more name/value pairs of dynamic data, such as name/value pairs for one or more scores for a program included in the JSON object, one or more availability or expiration dates for a program included in the JSON object, one or more availability or expiration dates for a showing included in the JSON object, a price for a showing included in the JSON object, one or more availability or expiration dates for an episode included in the JSON object, Boolean flags for determining whether an episode included in the JSON object is available on demand, and the like.

In some embodiments, the cache may be configured to periodically transmit an index status check to a central database. If one or more of such embodiments, the cache may skip the determination of whether to update the dynamic data of the JSON object during the cache hit process.

In some embodiments, at optional step 527, one or more other caches may be caused to request an update to the dynamic portions of the JSON object. For example and as discussed above, the network may include plural caches and each of the plural caches may be in communication with each other. In such arrangements, the cache may transmit one or more messages to other caches in order to cause each of the other caches to request the update to the dynamic portions of the JSON object. Once received by each of the other cache, each cache may retrieve the JSON object from its cache, request the update, process the JSON object based on the received updated data, and store the updated JSON object in its cache. In some arrangements, transmission of the one or more messages may be part of a Paxos algorithm implemented by the plural caches to ensure the data stored by the plural caches is consistent across the plural caches.

At step 528, it may be determined whether to request personalization metadata for the JSON object requested at step 501. As discussed above in connection with FIG. 2, a user or user device may have set up an option for personalized menus for one or more user interfaces (e.g., the user may have opted in for the personalization of the content guide of FIG. 4). By analyzing data indicating whether the user or user device has enrolled, the cache may determine whether or not to request personalization metadata for the JSON object. If the user or user device has setup or enrolled in personalized menus, the cache may proceed to step 529. If the user or user device has not set up or enrolled in personalized menus, the cache may proceed to step 535.

At step 529, a request for personalization metadata from the personalization database (e.g., personalization database 210 of FIG. 2) may be transmitted.

At step 531, it may be determined whether the personalization metadata requested at step 529 has been received by the cache. If the personalization metadata has not been received, the cache may continue waiting for receipt of the personalization metadata. If the JSON object has been received, the cache may proceed to step 533.

At step 533, a personalized JSON object may be generated based on the personalization metadata. For example, personalization metadata may take the form of one or more scores to apply to the programs, showings and/or episodes of the JSON object. In such embodiments, the new scores may be applied to the JSON object (e.g., stored as the values for the corresponding name/value pairs) and the programs, showings and/or episodes of the JSON object may be re-ranked or re-ordered according to the score. In some embodiments, the personalization data may take the form of a persona, such as one specific to the user or the user device, or one specific to a group of users or user devices. Using the personalization metadata, cache may re-rank or re-order the items included in the metadata object based on the personalization metadata (e.g., rank the movies listed in a metadata object for a menu based on a purchase or viewing history, rank the items according to the persona described by the personalization metadata).

In some instances, generating a personalized JSON object based on the personalization metadata may result in one or more program, episodes or showings being removed from the order or ranking of the JSON object. As one example, if the personalization metadata includes entitlement data that indicates the user or user device is not allowed access to a program, showing or episode, data for the program, showing or episode may be removed from the JSON object.

Additionally, in some instances, generating a personalized JSON object based on the personalization metadata may result in one or more program, episodes or showings being added the order or ranking of the JSON object. As one example, if the personalization metadata includes a viewing history and the cache determines that a particular program should be included in the JSON object based on the view history, data for the program, a showing of the program or an episode of the program may be added to the JSON object. In some instances, retrieving the data for the program may include searching the program cache for a matching object stored in the program cache; retrieving the data for the showing of the program may include searching the showing cache for a matching object stored in the showing cache; and retrieving the data for the episode of the program may include searching the episode cache for a matching object stored in the episode cache. Additionally or alternatively, retrieving the data for the program may include requesting and receiving a program object from the central database; retrieving the data for the showing of the program may include requesting and receiving a showing object from the central database; and retrieving the data for the episode of the program may include requesting and receiving an episode object from the central database.

At step 535, the object may be transmitted to the user device as a response to the request received at step 501.

At step 537, the cache hit process may end. In some embodiments, ending the cache hit process may include releasing the thread assigned to perform the cache miss process.

Figure 9A:
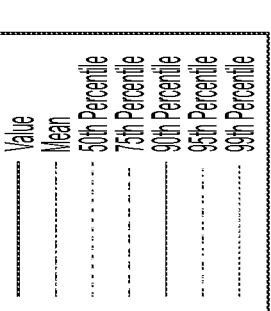
FIGS. 9A and 9B depict an illustrative example of possible response times in accordance with one or more aspects described herein.
Figure 9B:
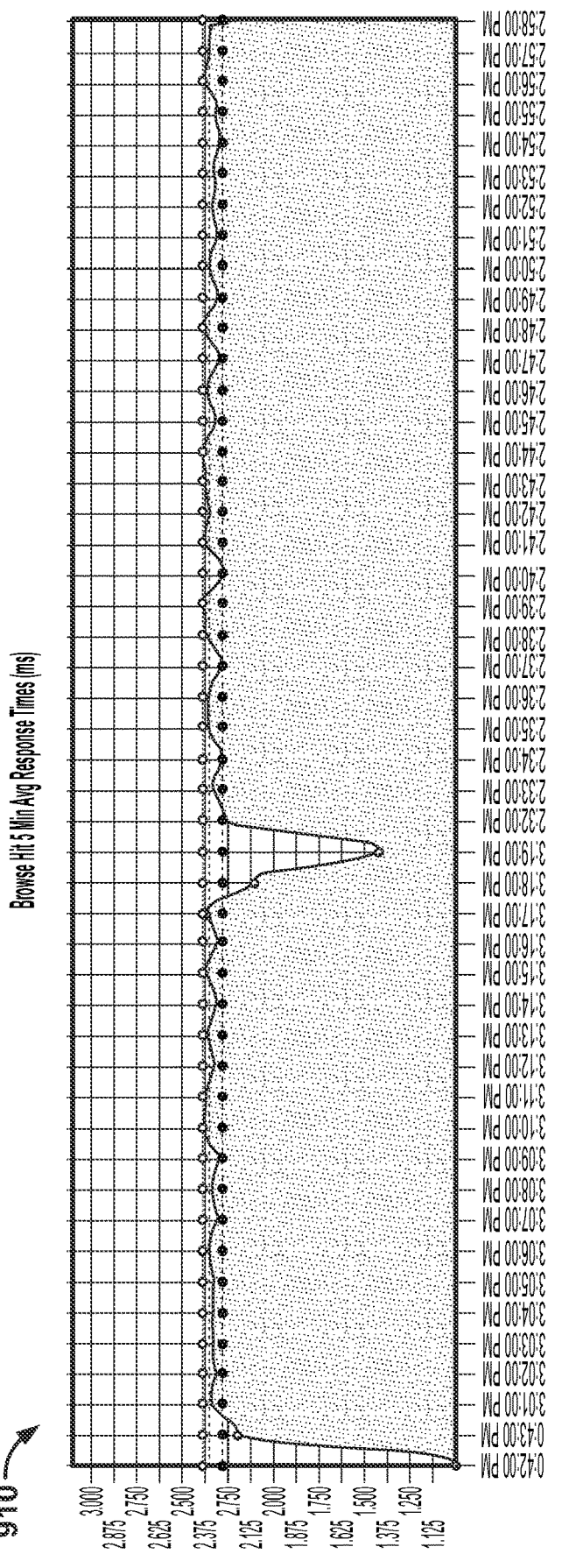

As described above in connection with FIGS. 4-8, a cache can be used to respond to a user device's request for a JSON object or other type of metadata object. FIGS. 9A and 9B depict an illustrative example of possible response times for a cache responding with a JSON object requested by a user device. Response time graph 900 in FIG. 9A includes the response times for when a cache miss occurs at the cache (e.g., steps 505-517 are performed by the cache) under certain experimental conditions. Response time graph 910 in FIG. 9B includes the response times for when a cache hit occurs at the cache (e.g., steps 525-537 are performed by the cache) under certain experimental conditions.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic.

Although specific examples of carrying out the disclosure have been described, those skilled in the art will appreciate that there are numerous variations and permutations of the above-described apparatuses and methods that are within the spirit and scope of the present disclosure. Any alteration, modification, and improvement that is made obvious by this disclosure or found to be within the spirit and/or scope of the disclosure is intended to be part of this description though not expressly stated herein. The various features described above are merely non-limiting examples, and may be rearranged, combined, subdivided, omitted, and/or altered in any desired manner.

The invention claimed is:

1. A method comprising:

receiving, by a computing device associated with a first user, metadata associated with a content item;

comparing values in the received metadata with corresponding values in metadata associated with a plurality of other users to identify:

a first value in the received metadata that was common for at least a threshold quantity of the plurality of other users; and a second value in the received metadata that was common for fewer than the threshold quantity of the plurality of other users;

causing, based on the comparing, the first value in the received metadata and the second value in the received metadata to be stored to different memory nodes in a memory node hierarchy; and causing output of a metadata object that is based on the first value in the received metadata and the second value in the received metadata.

2. The method of claim 1, further comprising:

receiving, by the computing device, a request for the received metadata;

retrieving an updated version of the second value in the received metadata; and causing output of a second metadata object that is based on the first value in the received metadata and the updated version of the second value in the received metadata.

3. The method of claim 1, wherein the first value in the received metadata comprises a title associated with the content item, and wherein the second value in the received metadata comprises at least one of:

an availability date, an expiration date, or a rating associated with the content item.

4. The method of claim 1, wherein the metadata object comprises at least one of:

a personalized metadata object that is based on personalization metadata;

at least one of a menu object, a program object, a showing object, or an episode object; or a JavaScript Object Notation (JSON) object.

5. The method of claim 1, wherein the metadata object comprises one or more programs, episodes, or showings, and wherein the causing output of the metadata object comprises re-ordering, based on personalization metadata, the one or more programs, episodes, or showings.

6. The method of claim 1, wherein the metadata object comprises one or more programs, episodes, or showings, and wherein the causing output of the metadata object comprises at least one of:

based on personalization metadata, adding a program, an episode, or a showing to the metadata object; or based on the personalization metadata, removing a program, an episode, or a showing from the metadata object.

7. The method of claim 1, wherein the metadata object is configured to cause the computing device to update, in a menu, at least one of a menu object, a program object, a showing object, or an episode object.

8. The method of claim 1, wherein the received metadata comprises a title of the content item and an availability date of the content item, and wherein the method further comprises:

separating, based on the first value in the received metadata comprising the title of the content item for the plurality of other users exceeding the threshold and the second value in the received metadata comprising the availability date of the content item for fewer than the threshold of the plurality of other users, the title from the availability date;

storing the title in a first cache; and storing the availability date in a second cache.

9. The method of claim 1, further comprising:

updating, based on an indication that an index associated with the received metadata has changed, the second value in the received metadata.

10. An apparatus comprising:

one or more processors; and memory storing instructions that, when executed by the one or more processors, cause the apparatus to:

receive metadata associated with a content item;

compare values in the received metadata with corresponding values in metadata associated with a plurality of other users to identify:

a first value in the received metadata that was common for at least a threshold quantity of the plurality of other users; and a second value in the received metadata that was common for fewer than the threshold quantity of the plurality of other users;

cause, based on the comparing, the first value in the received metadata and the second value in the received metadata to be stored to different memory nodes in a memory node hierarchy; and cause output of a metadata object that is based on the first value in the received metadata and the second value in the received metadata.

11. The apparatus of claim 10, wherein the instructions, when executed by the one or more processors, further cause the apparatus to:

receive a request for the received metadata;

retrieve an updated version of the second value in the received metadata; and cause output of a second metadata object that is based on the first value in the received metadata and the updated version of the second value in the received metadata.

12. The apparatus of claim 10, wherein the first value in the received metadata comprises a title associated with the content item, and wherein the second value in the received metadata comprises at least one of:

an availability date, an expiration date, or a rating associated with the content item.

13. The apparatus of claim 10, wherein the metadata object comprises at least one of:

a personalized metadata object that is based on personalization metadata;

at least one of a menu object, a program object, a showing object, or an episode object; or a JavaScript Object Notation (JSON) object.

14. The apparatus of claim 10, wherein the metadata object comprises one or more programs, episodes, or showings, and wherein the instructions, when executed by the one or more processors, cause the apparatus to cause output of the metadata object by re-ordering, based on personalization metadata, the one or more programs, episodes, or showings.

15. The apparatus of claim 10, wherein the metadata object comprises one or more programs, episodes, or showings, and wherein the instructions, when executed by the one or more processors, cause the apparatus to cause output of the metadata object by performing at least one of:

based on personalization metadata, adding a program, an episode, or a showing to the metadata object; or based on the personalization metadata, removing a program, an episode, or a showing from the metadata object.

16. The apparatus of claim 10, wherein the metadata object is configured to cause the apparatus to update, in a menu, at least one of a menu object, a program object, a showing object, or an episode object.

17. The apparatus of claim 10, wherein the instructions, when executed by the one or more processors, further cause the apparatus to update, based on an indication that an index associated with the received metadata has changed, the second value in the received metadata.

18. A non-transitory computer-readable medium storing instructions that, when executed, cause performance of actions comprising:

receiving metadata associated with a content item;

comparing values in the received metadata with corresponding values in metadata associated with a plurality of other users to identify:

a first value in the received metadata that was common for at least a threshold quantity of the plurality of other users; and a second value in the received metadata that was common for fewer than the threshold quantity of the plurality of other users;

causing, based on the comparing, the first value in the received metadata to be stored in a different memory than the second value in the received metadata; and causing output of a metadata object that is based on the first value in the received metadata and the second value in the received metadata.

19. The non-transitory computer-readable medium of claim 18, wherein the instructions, when executed, further cause performance of actions comprising:

receiving a request for the received metadata;

retrieving an updated version of the second value in the received metadata; and causing output of a second metadata object that is based on the first value in the received metadata and the updated version of the second value in the received metadata.

20. The non-transitory computer-readable medium of claim 18, wherein the first value in the received metadata comprises a title associated with the content item, and wherein the second value in the received metadata comprises at least one of:

an availability date, an expiration date, or a rating associated with the content item.

21. The non-transitory computer-readable medium of claim 18, wherein the metadata object comprises at least one of:

a personalized metadata object that is based on personalization metadata;

at least one of a menu object, a program object, a showing object, or an episode object; or a JavaScript Object Notation (JSON) object.

22. The non-transitory computer-readable medium of claim 18, wherein the metadata object comprises one or more programs, episodes, or showings, and wherein the instructions, when executed, cause performance of the causing output of the metadata object by re-ordering, based on personalization metadata, the one or more programs, episodes, or showings.

23. The non-transitory computer-readable medium of claim 18, wherein the metadata object comprises one or more programs, episodes, or showings, and wherein the instructions, when executed, cause performance of the causing output of the metadata object by at least one of:

based on personalization metadata, adding a program, an episode, or a showing to the metadata object; or based on the personalization metadata, removing a program, an episode, or a showing from the metadata object.

24. The non-transitory computer-readable medium of claim 18, wherein the metadata object is configured to cause update, in a menu, at least one of a menu object, a program object, a showing object, or an episode object.

25. The non-transitory computer-readable medium of claim 18, wherein the received metadata comprises a title of the content item and an availability date of the content item, and wherein the instructions, when executed, further cause performance of actions comprising:

separating, based the first value in the received metadata comprising the title of the content item for the plurality of other users exceeding the threshold and the second value in the received metadata comprising the availability date of the content item for fewer than the threshold of the plurality of other users, the title from the availability date;

storing the title in a first cache; and storing the availability date in a second cache.

26. The non-transitory computer-readable medium of claim 18, wherein the instructions, when executed, further cause updating, based on an indication that an index associated with the received metadata has changed, the second value in the received metadata.

27. The method of claim 1, wherein the received metadata, associated with a content item, describes the content item.

28. The method of claim 1, wherein the memory node hierarchy is configured as a B+ tree.

* * * * *